(12) United States Patent
Barnes et al.

(10) Patent No.: US 7,694,876 B2
(45) Date of Patent: Apr. 13, 2010

(54) METHOD AND SYSTEM FOR TRACKING USER PERFORMANCE

(75) Inventors: Brian Barnes, South Jordan, UT (US); David S. Bonalle, New Rochelle, NY (US); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 12/114,402

(22) Filed: May 2, 2008

(65) Prior Publication Data

US 2009/0091426 A1 Apr. 9, 2009

Related U.S. Application Data

(60) Division of application No. 10/708,597, filed on Mar. 12, 2004, now Pat. No. 7,503,480, which is a continuation-in-part of application No. 10/340,352, filed on Jan. 10, 2003, which is a continuation-in-part of application No. 10/192,488, filed on Jul. 9, 2002, now Pat. No. 7,239,226, said application No. 10/340,352 is a continuation-in-part of application No. 10/318,432, filed on Dec. 13, 2002, and a continuation-in-part of application No. 10/318,480, filed on Dec. 13, 2002, now Pat. No. 7,249,112.

(60) Provisional application No. 60/304,216, filed on Jul. 10, 2001, provisional application No. 60/396,577, filed on Jul. 16, 2002.

(51) Int. Cl.
G06F 17/00 (2006.01)
G06K 7/10 (2006.01)

(52) U.S. Cl. .................................. 235/377; 235/375

(58) Field of Classification Search ................. 235/380, 235/375, 379, 383, 91 L, 385; 705/14, 26, 705/27, 8, 414; 340/5.91; 367/127; 707/104.1; 709/104

See application file for complete search history.

(56) References Cited

U.S. PATENT DOCUMENTS 3,749,191 A * 7/1973 Ashen et al. ............... 235/91 L (Continued)

FOREIGN PATENT DOCUMENTS

CH 689070 A5 8/1988

(Continued)

OTHER PUBLICATIONS

"Physical Reality: A Second Look", Ken Sharp, Senior Technical Editor, http://www.idsystems.com/reader/1999_03/Phys0399_pt2/phys0399_pt2.htm (6 pages).

(Continued)

*Primary Examiner*—Thien M. Le
*Assistant Examiner*—Thien T Mai
(74) *Attorney, Agent, or Firm*—Snell & Wilmer L.L.P.

(57) ABSTRACT

A system and method for using RFID technology to track resource performance and task completion is disclosed. In one exemplary embodiment, a fob and an RFID reader may engage in mutual authentication. Where the RFID reader and the fob successfully mutually authenticate, the fob may transmit to the RFID reader information identifying the resource's performance tracking account to which the fob is associated. The RFID reader may receive and forward the information to facilitate performance tracking. In one exemplary embodiment, the RFID reader may forward the information to a point of interaction terminal for transaction completion. In another exemplary embodiment, the fob completes tasks via a computer interface. In still another exemplary embodiment, the fob resource and/or a manager may access a resource engine, wherein the resource engine may be used to automatically grade, track, score, and assign resources based on resource skills and skill sets.

6 Claims, 17 Drawing Sheets

U.S. PATENT DOCUMENTS

| | | |
|---|---|---|
| 4,303,904 A | 12/1981 | Chasek |
| 4,443,027 A | 4/1984 | McNeely et al. |
| 4,450,535 A | 5/1984 | de Pommery et al. |
| 4,475,308 A | 10/1984 | Heise et al. |
| 4,583,766 A | 4/1986 | Wessel |
| 4,639,765 A | 1/1987 | D'Hont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik et al. |
| 5,239,654 A | 8/1993 | Ing-Simmons et al. |
| 5,247,304 A | 9/1993 | D'Hont |
| 5,274,392 A | 12/1993 | D'Hont et al. |
| 5,276,311 A | 1/1994 | Hennige |
| 5,285,100 A | 2/1994 | Byatt |
| 5,295,064 A * | 3/1994 | Malec et al. ............... 340/5.91 |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schuermann et al. |
| 5,351,052 A | 9/1994 | Gove et al. |
| 5,365,551 A | 11/1994 | Snodgrass et al. |
| 5,371,896 A | 12/1994 | Gove et al. |
| 5,373,303 A | 12/1994 | D'Hont |
| 5,397,881 A | 3/1995 | Mannik |
| 5,406,271 A * | 4/1995 | Sonnendorfer et al. ..... 340/5.91 |
| 5,407,893 A | 4/1995 | Koshizuka et al. |
| 5,408,243 A | 4/1995 | D'Hont |
| 5,410,649 A | 4/1995 | Gove et al. |
| 5,428,363 A | 6/1995 | D'Hont |
| 5,453,747 A | 9/1995 | D'Hont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | D'Hont |
| 5,491,484 A | 2/1996 | Schuermann |
| 5,491,670 A * | 2/1996 | Weber ........................ 367/127 |
| 5,491,715 A | 2/1996 | Flaxl |
| 5,493,312 A | 2/1996 | Knebelkamp |
| 5,497,121 A | 3/1996 | D'Hont |
| 5,500,513 A | 3/1996 | Langhans et al. |
| 5,500,651 A | 3/1996 | Schuermann |
| 5,504,808 A | 4/1996 | Hamrick, Jr. |
| 5,513,525 A | 5/1996 | Schuermann |
| 5,519,381 A | 5/1996 | Marsh |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | D'Hont |
| 5,557,516 A | 9/1996 | Hogan |
| 5,561,430 A | 10/1996 | Knebelkamp |
| 5,563,582 A | 10/1996 | D'Hont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | D'Hont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | D'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujiola |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | D'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | D'Hont |
| 5,625,370 A | 4/1997 | D'Hont |
| 5,625,695 A | 4/1997 | M'Raihi |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schuermann |
| 5,649,118 A | 7/1997 | Carlisle |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe et al. |
| 5,686,920 A | 11/1997 | Hurta et al. |
| 5,689,100 A | 11/1997 | Carrithers |
| 5,691,731 A | 11/1997 | van Erven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | D'Hont et al. |
| 5,734,838 A | 3/1998 | Robinson et al. |

| | | | | | |
|---|---|---|---|---|---|
| 5,742,756 A | 4/1998 | Dillaway et al. | 5,912,678 A | 6/1999 | Saxena et al. |
| 5,742,845 A | 4/1998 | Wagner | 5,913,203 A | 6/1999 | Wong et al. |
| 5,748,137 A | 5/1998 | D'Hont | 5,914,472 A | 6/1999 | Foladare et al. |
| 5,748,737 A | 5/1998 | Daggar | 5,915,023 A | 6/1999 | Bernstein |
| 5,758,195 A | 5/1998 | Balmer | 5,917,168 A | 6/1999 | Nakamura et al. |
| 5,761,306 A | 6/1998 | Lewis | 5,918,216 A | 6/1999 | Miksovsky et al. |
| 5,761,493 A | 6/1998 | Blakeley et al. | 5,920,628 A | 7/1999 | Indeck et al. |
| 5,768,385 A | 6/1998 | Simon | 5,923,734 A | 7/1999 | Taskett |
| 5,768,609 A | 6/1998 | Gove et al. | 5,929,801 A | 7/1999 | Aslanidis et al. |
| 5,770,843 A | 6/1998 | Rose | 5,930,767 A | 7/1999 | Reber et al. |
| 5,774,882 A | 6/1998 | Keen et al. | 5,930,777 A | 7/1999 | Barber |
| 5,777,903 A | 7/1998 | Piosenka et al. | 5,931,917 A | 8/1999 | Nguyen et al. |
| 5,778,067 A | 7/1998 | Jones | 5,933,624 A | 8/1999 | Balmer |
| 5,778,069 A | 7/1998 | Thomlinson | 5,943,624 A | 8/1999 | Fox |
| 5,785,680 A | 7/1998 | Niezink et al. | 5,948,116 A | 9/1999 | Aslanidis et al. |
| 5,792,337 A | 8/1998 | Padovani et al. | 5,949,044 A | 9/1999 | Walker et al. |
| 5,793,324 A | 8/1998 | Aslanidis et al. | 5,949,876 A | 9/1999 | Ginter et al. |
| 5,794,095 A | 8/1998 | Thompson | 5,953,512 A | 9/1999 | Cai et al. |
| 5,797,060 A | 8/1998 | Thompson | 5,953,710 A | 9/1999 | Fleming |
| 5,797,085 A | 8/1998 | Beuk et al. | 5,955,717 A | 9/1999 | Vanstone |
| 5,797,133 A | 8/1998 | Jones et al. | 5,955,969 A | 9/1999 | D'Hont |
| 5,798,709 A | 8/1998 | Flaxl | 5,956,024 A | 9/1999 | Strickland et al. |
| 5,809,142 A | 9/1998 | Hurta et al. | 5,956,699 A | 9/1999 | Wong et al. |
| 5,809,288 A | 9/1998 | Balmer | 5,958,004 A | 9/1999 | Helland et al. |
| 5,809,633 A | 9/1998 | Mundigl et al. | 5,960,411 A | 9/1999 | Hartman et al. |
| 5,821,513 A * | 10/1998 | O'Hagan et al. ............. 235/383 | 5,963,915 A | 10/1999 | Kirsch |
| 5,825,007 A | 10/1998 | Jesadanont | 5,963,924 A | 10/1999 | Williams et al. |
| 5,825,302 A | 10/1998 | Stafford | 5,966,697 A | 10/1999 | Fergerson et al. |
| 5,826,077 A | 10/1998 | Blakeley et al. | 5,970,148 A | 10/1999 | Meier |
| 5,826,241 A | 10/1998 | Stein | 5,970,471 A | 10/1999 | Hill |
| 5,826,242 A | 10/1998 | Montulli | 5,970,472 A | 10/1999 | Allsop et al. |
| 5,826,243 A | 10/1998 | Musmanno et al. | 5,970,473 A | 10/1999 | Gerszberg et al. |
| 5,828,044 A | 10/1998 | Jun et al. | 5,970,475 A | 10/1999 | Barnes et al. |
| 5,834,756 A | 11/1998 | Gutman et al. | RE36,365 E | 11/1999 | Levine et al. |
| 5,835,894 A | 11/1998 | Adcock et al. | 5,978,840 A | 11/1999 | Nguyen et al. |
| 5,841,364 A | 11/1998 | Hagl et al. | 5,979,757 A | 11/1999 | Tracy et al. |
| 5,842,088 A | 11/1998 | Thompson | 5,982,293 A | 11/1999 | Everett et al. |
| 5,844,218 A | 12/1998 | Kawan et al. | 5,983,207 A | 11/1999 | Turk et al. |
| 5,844,230 A | 12/1998 | Lalonde | 5,983,208 A | 11/1999 | Haller et al. |
| 5,845,267 A | 12/1998 | Ronen | 5,984,180 A | 11/1999 | Albrecht |
| 5,851,149 A | 12/1998 | Xidos et al. | 5,987,140 A | 11/1999 | Rowney et al. |
| 5,852,812 A | 12/1998 | Reeder | 5,987,155 A | 11/1999 | Dunn et al. |
| 5,854,891 A | 12/1998 | Postlewaite | 5,987,498 A | 11/1999 | Athing et al. |
| 5,858,006 A | 1/1999 | Van der AA et al. | 5,989,950 A | 11/1999 | Wu |
| 5,859,419 A | 1/1999 | Wynn | 5,991,413 A | 11/1999 | Arditti et al. |
| 5,859,779 A | 1/1999 | Giordano et al. | 5,991,608 A | 11/1999 | Leyten |
| 5,862,325 A | 1/1999 | Reed et al. | 5,991,748 A | 11/1999 | Taskett |
| 5,864,306 A | 1/1999 | Dwyer et al. | 5,991,750 A | 11/1999 | Watson |
| 5,864,323 A | 1/1999 | Berthon | 5,996,076 A | 11/1999 | Rowney et al. |
| 5,864,830 A | 1/1999 | Armetta et al. | 5,999,914 A | 12/1999 | Blinn et al. |
| 5,867,100 A | 2/1999 | D'Hont | 6,000,832 A | 12/1999 | Franklin et al. |
| 5,870,031 A | 2/1999 | Kaiser et al. | 6,002,438 A | 12/1999 | Hocevar et al. |
| 5,870,915 A | 2/1999 | D'Hont | 6,002,767 A | 12/1999 | Kramer |
| 5,878,138 A | 3/1999 | Yacobi | 6,003,014 A | 12/1999 | Lee et al. |
| 5,878,141 A | 3/1999 | Daly et al. | 6,005,942 A | 12/1999 | Chan et al. |
| 5,878,215 A | 3/1999 | Kling et al. | 6,006,216 A | 12/1999 | Griffin et al. |
| 5,878,337 A | 3/1999 | Joao et al. | 6,009,412 A | 12/1999 | Storey |
| 5,878,403 A | 3/1999 | DeFrancesco et al. | 6,011,487 A | 1/2000 | Plocher |
| 5,880,675 A | 3/1999 | Trautner | 6,012,039 A | 1/2000 | Hoffman et al. |
| 5,881,272 A | 3/1999 | Balmer | 6,012,049 A | 1/2000 | Kawan |
| 5,883,810 A | 3/1999 | Franklin et al. | 6,012,143 A | 1/2000 | Tanaka |
| 5,884,280 A | 3/1999 | Yoshioka et al. | 6,012,636 A | 1/2000 | Smith |
| 5,887,266 A | 3/1999 | Heinonen et al. | 6,014,634 A | 1/2000 | Scroggie et al. |
| 5,890,137 A | 3/1999 | Koreeda | 6,014,635 A | 1/2000 | Harris et al. |
| 5,897,622 A | 4/1999 | Blinn et al. | 6,014,636 A | 1/2000 | Reeder |
| 5,898,783 A | 4/1999 | Rohrbach | 6,014,645 A | 1/2000 | Cunningham |
| 5,898,838 A | 4/1999 | Wagner | 6,014,646 A | 1/2000 | Vallee et al. |
| 5,903,830 A | 5/1999 | Joao et al. | 6,014,648 A | 1/2000 | Brennan |
| 5,903,875 A | 5/1999 | Kohara | 6,014,650 A | 1/2000 | Zampese |
| 5,903,880 A | 5/1999 | Biffar | 6,014,748 A | 1/2000 | Tushi et al. |
| 5,905,798 A | 5/1999 | Nerlikar et al. | 6,016,482 A | 1/2000 | Molinari et al. |
| 5,905,908 A | 5/1999 | Wagner | 6,016,484 A | 1/2000 | Williams et al. |
| 5,909,492 A | 6/1999 | Payne et al. | 6,018,717 A | 1/2000 | Lee et al. |

| | | | | | | |
|---|---|---|---|---|---|---|
| 6,018,718 | A | 1/2000 | Walker et al. | 6,192,255 B1 | 2/2001 | Lewis et al. |
| 6,021,943 | A | 2/2000 | Chastain | 6,198,728 B1 | 3/2001 | Hulyalkar et al. |
| 6,023,510 | A | 2/2000 | Epstein | 6,198,875 B1 | 3/2001 | Edenson et al. |
| 6,024,286 | A | 2/2000 | Bradley et al. | 6,202,927 B1 | 3/2001 | Bashan et al. |
| 6,029,147 | A | 2/2000 | Horadan et al. | 6,205,151 B1 | 3/2001 | Quay et al. |
| 6,029,149 | A | 2/2000 | Dykstra et al. | 6,206,293 B1 | 3/2001 | Gutman et al. |
| 6,029,150 | A | 2/2000 | Kravitz | 6,213,390 B1 | 4/2001 | Oneda |
| 6,029,890 | A | 2/2000 | Austin | 6,215,437 B1 | 4/2001 | Schuermann |
| 6,029,892 | A | 2/2000 | Miyake | 6,216,219 B1 | 4/2001 | Cai et al. |
| 6,032,136 | A | 2/2000 | Brake et al. | 6,219,439 B1 | 4/2001 | Burger |
| 6,038,292 | A | 3/2000 | Thomas | 6,220,510 B1 | 4/2001 | Everett et al. |
| 6,038,551 | A | 3/2000 | Barlow et al. | 6,222,914 B1 | 4/2001 | McMullin |
| 6,038,584 | A | 3/2000 | Balmer | D442,627 S | 5/2001 | Webb et al. |
| 6,041,308 | A | 3/2000 | Walker et al. | D442,629 S | 5/2001 | Webb et al. |
| 6,044,360 | A | 3/2000 | Picciallo | 6,223,984 B1 | 5/2001 | Renner et al. |
| 6,047,888 | A | 4/2000 | Dethloff | 6,226,382 B1 | 5/2001 | M'Raihi |
| 6,052,675 | A | 4/2000 | Checchio | 6,227,447 B1 | 5/2001 | Campisano |
| 6,058,418 | A | 5/2000 | Kobata | 6,230,270 B1 | 5/2001 | Laczko, Sr. |
| 6,061,344 | A | 5/2000 | Wood, Jr. | 6,232,917 B1 | 5/2001 | Baumer et al. |
| 6,061,789 | A | 5/2000 | Hauser et al. | 6,233,683 B1 | 5/2001 | Chan et al. |
| 6,064,320 | A | 5/2000 | D'Hont et al. | 6,237,848 B1 | 5/2001 | Everett |
| 6,064,981 | A | 5/2000 | Barni et al. | 6,239,675 B1 | 5/2001 | Flaxl |
| 6,070,003 | A | 5/2000 | Gove et al. | 6,240,187 B1 | 5/2001 | Lewis |
| 6,070,150 | A | 5/2000 | Remington et al. | 6,248,199 B1 | 6/2001 | Smulson |
| 6,070,154 | A | 5/2000 | Tavor et al. | 6,257,486 B1 | 7/2001 | Teicher et al. |
| 6,072,870 | A | 6/2000 | Nguyen et al. | 6,259,769 B1 | 7/2001 | Page et al. |
| 6,073,840 | A | 6/2000 | Marion | 6,260,026 B1 | 7/2001 | Tomida et al. |
| 6,076,078 | A | 6/2000 | Camp et al. | 6,260,088 B1 | 7/2001 | Gove et al. |
| 6,078,888 | A | 6/2000 | Johnson, Jr. | 6,263,316 B1 | 7/2001 | Khan et al. |
| 6,078,906 | A | 6/2000 | Huberman | 6,264,106 B1 | 7/2001 | Bridgelall |
| 6,078,908 | A | 6/2000 | Schmitz | 6,266,754 B1 | 7/2001 | Laczko et al. |
| 6,081,790 | A | 6/2000 | Rosen | 6,267,292 B1 | 7/2001 | Walker et al. |
| RE36,788 | E | 7/2000 | Mansvelt et al. | 6,269,348 B1 | 7/2001 | Pare et al. |
| 6,088,683 | A | 7/2000 | Jalili | 6,273,335 B1 | 8/2001 | Sloan |
| 6,088,686 | A | 7/2000 | Walker et al. | 6,282,522 B1 | 8/2001 | Davis et al. |
| 6,088,717 | A | 7/2000 | Reed et al. | D447,515 S | 9/2001 | Faenza, Jr. et al. |
| 6,088,797 | A | 7/2000 | Rosen | 6,286,763 B1 | 9/2001 | Reynolds et al. |
| 6,092,057 | A | 7/2000 | Zimmerman et al. | 6,289,324 B1 | 9/2001 | Kawan |
| 6,092,198 | A | 7/2000 | Lanzy et al. | 6,293,462 B1 | 9/2001 | Gangi |
| 6,098,053 | A | 8/2000 | Slater | 6,315,193 B1 | 11/2001 | Hogan |
| 6,098,879 | A | 8/2000 | Terranova | 6,315,195 B1 | 11/2001 | Ramachandran |
| 6,101,174 | A | 8/2000 | Langston | 6,317,721 B1 | 11/2001 | Hurta et al. |
| 6,102,162 | A | 8/2000 | Teicher | 6,318,636 B1 | 11/2001 | Reynolds et al. |
| 6,102,672 | A | 8/2000 | Woollenweber et al. | 6,323,566 B1 | 11/2001 | Meier et al. |
| 6,105,008 | A | 8/2000 | Davis et al. | 6,325,285 B1 | 12/2001 | Baratelli |
| 6,105,013 | A | 8/2000 | Curry et al. | 6,325,293 B1 | 12/2001 | Moreno |
| 6,105,865 | A | 8/2000 | Hardesty | 6,326,934 B1 | 12/2001 | Kinzie |
| 6,108,641 | A | 8/2000 | Kenna et al. | 6,327,573 B1 | 12/2001 | Walker et al. |
| 6,109,525 | A | 8/2000 | Blomqvist et al. | 6,330,544 B1 | 12/2001 | Walker et al. |
| 6,112,152 | A | 8/2000 | Tuttle | 6,336,095 B1 | 1/2002 | Rosen |
| 6,112,191 | A | 8/2000 | Burke | 6,342,844 B1 | 1/2002 | Rozin |
| 6,115,360 | A | 9/2000 | Quay et al. | 6,353,811 B1 | 3/2002 | Weissman |
| 6,115,458 | A | 9/2000 | Taskett | 6,364,208 B1 | 4/2002 | Stanford et al. |
| 6,116,423 | A | 9/2000 | Troxtell, Jr. | 6,367,011 B1 | 4/2002 | Lee et al. |
| 6,116,505 | A | 9/2000 | Withrow | 6,374,245 B1 | 4/2002 | Park |
| 6,118,189 | A | 9/2000 | Flaxl | 6,377,034 B1 | 4/2002 | Ivanov |
| 6,121,544 | A | 9/2000 | Petsinger | 6,378,073 B1 | 4/2002 | Davis et al. |
| 6,122,625 | A | 9/2000 | Rosen | 6,388,533 B2 | 5/2002 | Swoboda |
| 6,123,223 | A | 9/2000 | Watkins | 6,390,375 B2 | 5/2002 | Kayanakis |
| 6,125,352 | A | 9/2000 | Franklin et al. | 6,400,272 B1 | 6/2002 | Holtzman |
| 6,129,274 | A | 10/2000 | Suzuki | 6,402,026 B1 | 6/2002 | Schwier |
| 6,133,834 | A | 10/2000 | Eberth et al. | 6,402,028 B1 | 6/2002 | Graham et al. |
| 6,141,651 | A | 10/2000 | Riley et al. | 6,411,611 B1 | 6/2002 | van der Tuijn |
| 6,141,752 | A | 10/2000 | Dancs et al. | 6,415,978 B1 | 7/2002 | McAllister |
| 6,163,771 | A | 12/2000 | Walker et al. | 6,422,464 B1 | 7/2002 | Terranova |
| 6,167,236 | A | 12/2000 | Kaiser et al. | 6,422,532 B1 | 7/2002 | Garner |
| 6,173,269 | B1 | 1/2001 | Sokol et al. | 6,424,029 B1 | 7/2002 | Giesler |
| 6,173,272 | B1 | 1/2001 | Thomas et al. | RE37,822 E | 8/2002 | Anthonyson |
| 6,177,860 | B1 | 1/2001 | Cromer et al. | 6,427,910 B1 | 8/2002 | Barnes et al. |
| 6,179,205 | B1 | 1/2001 | Sloan | 6,438,235 B2 | 8/2002 | Sims, III |
| 6,179,206 | B1 | 1/2001 | Matsumori | 6,439,455 B1 | 8/2002 | Everett et al. |
| 6,188,994 | B1 | 2/2001 | Egendorf | 6,445,794 B1 | 9/2002 | Shefi |
| 6,189,787 | B1 | 2/2001 | Dorf | 6,457,996 B1 | 10/2002 | Shih |

| | | |
|---|---|---|
| 6,466,804 B1 | 10/2002 | Pecen et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,481,621 B1 | 11/2002 | Herrendoerfer et al. |
| 6,481,632 B2 | 11/2002 | Wentker et al. |
| 6,483,427 B1 | 11/2002 | Werb |
| 6,483,477 B1 | 11/2002 | Plonka |
| 6,483,929 B1 | 11/2002 | Murakami |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,380 B2 | 12/2002 | Jarosz |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawaru |
| 6,519,565 B1 | 2/2003 | Clements et al. |
| 6,520,542 B2 | 2/2003 | Thompson et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 * | 7/2003 | Treyz et al. ............. 705/14 |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,995 B1 | 8/2003 | Kawasaki et al. |
| 6,609,655 B1 | 8/2003 | Harrell |
| 6,623,039 B2 | 9/2003 | Thompson et al. |
| 6,626,356 B2 | 9/2003 | Davenport et al. |
| 6,628,961 B1 | 9/2003 | Ho et al. |
| 6,636,833 B1 | 10/2003 | Flitcroft et al. |
| 6,650,887 B2 | 11/2003 | McGregor et al. |
| 6,662,166 B2 | 12/2003 | Pare et al. |
| 6,665,405 B1 | 12/2003 | Lenstra |
| 6,669,086 B2 | 12/2003 | Abdi et al. |
| 6,671,358 B1 | 12/2003 | Seidman et al. |
| 6,674,786 B1 | 1/2004 | Nakamura et al. |
| 6,678,698 B2 * | 1/2004 | Fredell et al. ............ 707/104.1 |
| 6,679,427 B1 | 1/2004 | Kuroiwa |
| 6,681,328 B1 | 1/2004 | Harris et al. |
| 6,684,269 B2 | 1/2004 | Wagner |
| 6,687,714 B1 | 2/2004 | Kogen et al. |
| 6,690,930 B1 | 2/2004 | Dupre |
| 6,693,513 B1 | 2/2004 | Tuttle |
| 6,705,530 B2 | 3/2004 | Kiekhaefer |
| 6,711,262 B1 | 3/2004 | Watanen |
| 6,725,206 B1 * | 4/2004 | Coveley ............. 705/414 |
| 6,732,936 B1 | 5/2004 | Kiefhaefer |
| 6,742,120 B1 | 5/2004 | Markakis et al. |
| 6,747,546 B1 | 6/2004 | Hikita et al. |
| 6,760,581 B2 | 7/2004 | Dutta |
| 6,769,718 B1 | 8/2004 | Warther et al. |
| 6,771,981 B1 | 8/2004 | Zalewski |
| 6,789,012 B1 | 9/2004 | Childs et al. |
| 6,834,270 B1 | 12/2004 | Pagani et al. |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,895,310 B1 | 5/2005 | Kolls |
| 6,928,343 B2 * | 8/2005 | Cato ............. 340/5.91 |
| 6,994,262 B1 | 2/2006 | Warther |
| 7,003,501 B2 | 2/2006 | Ostroff |
| 7,069,444 B2 | 6/2006 | Lowensohn et al. |
| 7,096,204 B1 | 8/2006 | Chen et al. |
| 7,100,821 B2 | 9/2006 | Rasti |
| 7,103,575 B1 | 9/2006 | Linehan |
| 7,136,835 B1 | 11/2006 | Flitcroft et al. |
| 7,139,720 B1 * | 11/2006 | Foell et al. ............. 705/8 |
| 7,213,748 B2 | 5/2007 | Tsuei et al. |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0034720 A1 | 10/2001 | Armes |
| 2001/0039617 A1 | 11/2001 | Buhrlen et al. |
| 2001/0049628 A1 | 12/2001 | Icho |
| 2002/0011519 A1 | 1/2002 | Shults, III |
| 2002/0026419 A1 | 2/2002 | Maritzen et al. |
| 2002/0028704 A1 | 3/2002 | Bloomfield et al. |
| 2002/0035548 A1 | 3/2002 | Hogan et al. |
| 2002/0046341 A1 | 4/2002 | Kazaks et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0154795 A1 | 10/2002 | Lee et al. |
| 2002/0166891 A1 | 11/2002 | Stoutenberg et al. |
| 2002/0174067 A1 | 11/2002 | Hoffman et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | D'Arbeloff et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018567 A1 | 1/2003 | Flitcroft et al. |
| 2003/0025600 A1 | 2/2003 | Blanchard |
| 2003/0028481 A1 | 2/2003 | Flitcroft et al. |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0061261 A1 * | 3/2003 | Greene ............. 709/104 |
| 2003/0069828 A1 | 4/2003 | Blazey et al. |

| | | | |
|---|---|---|---|
| 2003/0069846 A1 | 4/2003 | Marcon | |
| 2003/0112972 A1 | 6/2003 | Hattick et al. | |
| 2003/0120554 A1 | 6/2003 | Hogan et al. | |
| 2003/0121969 A1 | 7/2003 | Wankmueller | |
| 2003/0130820 A1 | 7/2003 | Lane | |
| 2003/0132284 A1 | 7/2003 | Reynolds et al. | |
| 2003/0140228 A1 | 7/2003 | Binder | |
| 2003/0163699 A1 | 8/2003 | Pailles et al. | |
| 2003/0167207 A1 | 9/2003 | Berardi et al. | |
| 2003/0177347 A1 | 9/2003 | Schneier et al. | |
| 2003/0183689 A1 | 10/2003 | Swift et al. | |
| 2003/0183699 A1 | 10/2003 | Masui | |
| 2003/0187786 A1 | 10/2003 | Swift et al. | |
| 2003/0187787 A1 | 10/2003 | Freund | |
| 2003/0187790 A1 | 10/2003 | Swift et al. | |
| 2003/0187796 A1 | 10/2003 | Swift et al. | |
| 2003/0195037 A1 | 10/2003 | Vuong et al. | |
| 2003/0195842 A1 | 10/2003 | Reece | |
| 2003/0195843 A1 | 10/2003 | Matsuda et al. | |
| 2003/0200184 A1 | 10/2003 | Dominguez et al. | |
| 2003/0218066 A1 | 11/2003 | Fernandes et al. | |
| 2003/0220876 A1 | 11/2003 | Burger et al. | |
| 2003/0222153 A1 | 12/2003 | Pentz et al. | |
| 2003/0225623 A1 | 12/2003 | Wankmueller | |
| 2003/0225713 A1 | 12/2003 | Atkinson et al. | |
| 2003/0227550 A1 | 12/2003 | Manico et al. | |
| 2003/0233334 A1 | 12/2003 | Smith | |
| 2004/0006539 A1 | 1/2004 | Royer et al. | |
| 2004/0010462 A1 | 1/2004 | Moon et al. | |
| 2004/0015451 A1 | 1/2004 | Sahota et al. | |
| 2004/0016796 A1 | 1/2004 | Hanna et al. | |
| 2004/0020982 A1 | 2/2004 | Hoffman et al. | |
| 2004/0029569 A1 | 2/2004 | Khan et al. | |
| 2004/0030601 A1 | 2/2004 | Pond et al. | |
| 2004/0039814 A1 | 2/2004 | Crabtree et al. | |
| 2004/0039860 A1 | 2/2004 | Mills et al. | |
| 2004/0044627 A1 | 3/2004 | Russell et al. | |
| 2004/0083184 A1 | 4/2004 | Tsuei et al. | |
| 2004/0139021 A1 | 7/2004 | Reed et al. | |
| 2005/0017068 A1 | 1/2005 | Zalewski et al. | |
| 2005/0038718 A1 | 2/2005 | Barnes et al. | |
| 2005/0040272 A1 | 2/2005 | Argumedo et al. | |
| 2005/0119978 A1 | 6/2005 | Ates | |
| 2005/0121512 A1 | 6/2005 | Wankmueller | |

FOREIGN PATENT DOCUMENTS

| | | | |
|---|---|---|---|
| EP | 0 358 525 A2 | 3/1990 | |
| EP | 0 424 726 | 10/1990 | |
| EP | 0 484 726 A1 | 5/1992 | |
| EP | 0 933 717 | 8/1999 | |
| EP | 0 956 818 | 11/1999 | |
| EP | 0 959 440 | 11/1999 | |
| EP | 0 984 404 | 3/2000 | |
| EP | 1 016 947 A2 | 7/2000 | |
| EP | 1 039 403 | 9/2000 | |
| EP | 1 104 909 | 6/2001 | |
| EP | 1 113 387 | 7/2001 | |
| EP | 1 115 095 A2 | 7/2001 | |
| EP | 1 199 684 | 4/2002 | |
| EP | 1 251 450 | 10/2002 | |
| EP | 02/097575 A2 | 12/2002 | |
| GB | 2347537 | 9/2000 | |
| GB | 2 361 790 A | 10/2001 | |
| JP | 2000-11109 | 1/2000 | |
| JP | 2000015288 | 1/2000 | |
| JP | 2000-40181 | 2/2000 | |
| JP | 2000067312 | 3/2000 | |
| JP | 2000207641 | 7/2000 | |
| JP | 2001-5931 | 1/2001 | |
| JP | 2001283122 | 10/2001 | |
| WO | 95/32919 | 12/1995 | |
| WO | WO 95/32919 | 12/1995 | |
| WO | 97/09688 A3 | 3/1997 | |
| WO | 99/03057 | 1/1999 | |
| WO | 99/49424 A1 | 9/1999 | |
| WO | 00/10144 | 2/2000 | |
| WO | 00/38088 | 6/2000 | |
| WO | 00/49586 A1 | 8/2000 | |
| WO | 01/04825 | 1/2001 | |
| WO | 01/15098 | 3/2001 | |
| WO | 01/43095 | 6/2001 | |
| WO | 01/72224 | 10/2001 | |
| WO | 01/77856 | 10/2001 | |
| WO | 01/80473 | 10/2001 | |
| WO | 01/86535 | 11/2001 | |
| WO | 01/90962 | 11/2001 | |
| WO | 01/95243 | 12/2001 | |
| WO | 02/01485 | 1/2002 | |
| WO | 02/13134 | 2/2002 | |
| WO | 02/21903 A1 | 3/2002 | |
| WO | 02/006526 | 8/2002 | |
| WO | 02/063545 | 8/2002 | |
| WO | 02/065246 A3 | 8/2002 | |
| WO | 02/065404 | 8/2002 | |
| WO | 02/069221 | 9/2002 | |
| WO | 02/073512 | 9/2002 | |
| WO | 02-086665 | 10/2002 | |
| WO | 02-091281 | 11/2002 | |
| WO | 02/101670 | 12/2002 | |
| WO | 03/007623 A3 | 1/2003 | |

OTHER PUBLICATIONS

"Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pat-At-The-Pump System", Press Release, Apr. 5, 1999, http://www.ti.com/tiris/does/news_release/rel12.htm (3 pages).

"Speedpass Unleased", Jun. 4, 2002, http://www.cardweb.com/cardtrak/news/cf2_20a_97.html (2 pages).

Phophecy Central Update #9, Oct. 10, 1997, http://www.bible.prophecy.com/pcu9.htm (5 pages).

International Newsletter of the TI RFID Group, Issue 20, 2000 (12 pages).

"CES Microsoft's SPOT Technology has Humble Origins", by James Niccolai, Jan. 10, 2003, http://archive.inforworld.com/hn/xml/03/01/10/030110hnspot.xml?2=IDGNS (3 pages).

"Microsoft: See SPOT Run on Your Wrist", by Richard Shim Jun. 5, 203, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43560,00.asp (2 pages).

"Microsoft Launches Smart Personal Object Technology Initiative", Press Release from COMDEX Fall 2002, Nov. 17, 2002, http://www.Microsoft.com/presspass/feature/2002/nov02/11-17SPOT.asp (4 pages).

Functional Specification, Standard Card IC MFI IC S50, Philips Semiconductors, Product Specification Rev 5.1 May 2001.

"Bank Extends RFID Payment Pilot: Bank of America will continue to test it's Quick Wave RFID payment card for another three months", RFID Journal, Jan. 23, 2003.

"MasterCard to test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic-ticket network", RFID Journal, Aug. 21, 2002.

"Security for Wireless Java: NTRU, a startup that offers security software, has released a Java version of its NTRU encryption algorithm", RFID Journal, Jun. 27, 2002.

"Making RFID Payments Ubiquitous: Philps and Visa want people to be able to pay for goods and services anywhere by using RFID chips embedded in phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instrument's ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Bonsor, "How Facial Recognition Systems Work", http://computer.howstuffworks.com/facial-recognition.htm/printable, Feb. 18, 2004, 6 pages.

Bowman, "Everything You Need to Know About Biometrics", Identix Corporation, Jan. 2008, 8 pages.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Docmemory, RFID Takes Priority With Wal-Mart, http://www.simmtester.com/page/news/shownews.asp?num=6650, Feb. 9, 2004, 2 pages.

Evers, "Judge Dismisses FTC Suite Against Rambus", IDG New Service, http://www.infoworld.com/article/04/02/18/HNjudgedismisses_1.html, Feb. 18, 2004, 3 pages.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC numbers for the Web, The Register, www.theregister.com.uk/content/1/13132.html, Sep. 9, 2000.

Harris, "How Fingerprint Scanners Work", http://computer.howstuffworks.com/fingerprint-scanner.htm/printable, Feb. 18, 2004, 6 pages.

http://www.palowireless.com/infotooth/tutorial.asp, Apr. 28, 2003.

http://www.palowireless.com/infotooth/tutorial/l2cap.asp, Apr. 28, 2003.

http://www.palowireless.com/infotooth/tutorial/baseband.asp, Apr. 28, 2003.

http://www.palowireless.com/infotooth/tutorial/hci.asp, Apr. 28, 2003.

http://www.palowireless.com/infotooth/tutorial/lmp.asp, Apr. 28, 2003.

http://www.palowireless.com/infotooth/tutorial/k1_gap.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/whatis.asp, Apr. 28, 2003.

http://www.semiconductors.philips.com/news/content/file_878.html, Apr. 7, 2003.

Hurley et al., "Automatic Ear Recognition by Force Field Transformations", The Institution of Electrical Engineers, 2000, pp. 7/1-7/5.

International Search Report and Written Opinion of the International Searching Authority, PCT/US05/26067, May 23, 2007.

International Search Report and Written Opinion of the International Searching Authority, PCT/US05/26101, May 13, 2008.

Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.

Kulkarni, et al., "Biometrics: Speaker Verification"http://biometrics.cse.msu.edu/speaker.html, Mar. 8, 2004, 5 pages.

Kuntz, Mary, "Credit Cards as Good as Gold", Forbes, Nov. 4, 1985.

Lahey, Liam, "Microsoft Bolsters Rebate Structure", Computer Dealer News, Feb. 8, 2002.

Lamond, "Credit Card Transactions Real World and Online" © 1996.

Luettin, "Visual Speech and Speaker Recognition", http://herens.idiap.ch/~luettin/luettin-thesis.bib.abs.html, Jun. 30, 2000, 1 page.

Martin, Zack, One-Time Numbers Stop Web Hackers From Pilfering Data, Card Marketing, Thomson Financial, www.cardforum.com/html/cardmark/jan01_c3.htm, Jan. 2001.

McPerson, "The Evolution of Mobile Payment", Financial Insights, http://www.banktech.com/story/news/showArticle.jhtml?articleID=17601432, Feb. 2, 2004, 2 pages.

Nyman, Judy, "Free Income Tax Clinics are Opening as Apr. 30 Deadline Draws Nearer", The Toronto Star, Final Edition, Mar. 25, 1986.

Obel, Michael, "Oil Companies Push Marketing, Cost Cutting to Fortify Earnings", Oil & Gas Journal, Sep. 16, 1985.

RFID Smart Card Gain Ground: The convenience of contactless transactions is driving widespread adoption of contactless smart "cards", RFID Journal, Apr. 9, 2003.

Roberti, "TI Embraces Prox Card Standard", http://www.ti.com/tiris/docs/news/in_the_news/2003/3-6-03.shtml, Mar. 6, 2003, 2 pages.

Rohde, "Microsoft, IBM and Phillips Test RFID Technology", IDG New Service, http://www.computerweekly.com/Article127889.htm, Feb. 9, 2004, 3 pages.

Ross et al., "Biometrics: Hand Geometry", http://biometrics.cse.msu.msu.edu/hand_geometry.html, Feb. 26, 2004, 2 pages.

Schmuckler, Eric, "Playing Your Cards Right", Forbes, Dec. 28, 1987.

Sony, Philips to Test RFID Platform, RFID Journal, May 8, 2003, 2 pages.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union- Discover the Advantage", http://coreone.org/2visa.html, Copyright 2001, (Last Visited Oct. 9, 2002).

"Credit Card Offer Travelers New Benefit", PR Newswire, Aug. 5, 1987.

"Fingerprint Analysis- The Basics", http://www.crimtrac.gov.au/fingerprintanalysis.htm, Feb. 18, 2004, 3 pages.

"Fingerprint Technology- Identix Inc.- Empowering Identification™- Understanding Biometrics", http://www.identix.com/newsroom/news_biometrics_finger.html, Feb. 18, 2004, 1 page.

"Individual Biometric- Facial Recognition", http://ctl.ncsc.dni.us/biomet%20web/Bmfacial.html, Feb. 18, 2004, 2 pages.

"Individual Biometric- Fingerprint", http://ctl.ncsc.dni.us/biomet%20web/BMFingerprint.html, Feb. 18, 2004, 3 pages.

"Individual Biometric- Hand Geometry", http://ctl.ncsc.dni.us/biomet%20web/BMHand.html, Feb. 18, 2004, 2 pages.

"Individual Biometric- Iris Scan", http://ctl.ncsc.dni.us/biomet%20web/BMIris.html, Feb. 18, 2004, 2 pages.

"Individual Biometric- Retinal Scan", http://ctl.ncsc.dni.us/biomet%20web/BMRetinal.html, Feb. 18, 2004, 2 pages.

"Individual Biometric- Vascular Patterns", http://ctl.ncsc.dni.us/biomet%20web/BMVascular.html, Feb. 18, 2004, 1 page.

"International Biometric Group- Signature Biometrics: How it Works", http://www.ibgweb.com/reports/public/reports/signature-scan_tech.html, Feb. 18, 2004, 1 page.

"International Biometric Group- Voice Recognition Technology: How It Works", http://www.ibgweb.com/reports/public/reports/voice-scan_tech.html, Feb. 18, 2004, 1 page.

"ISO Magnetic Strip Card Standards", http://www.cyberd.co.uk/support/technotes/isocards.htm, Feb. 9, 2004, 4 pages.

"New Evidence about Positive Three-Tier Co-pay Performance Presented at Express Scripts 2000 Outcomes Conference", PR Newswire Association, Inc., Jun. 28, 2000.

"Pay by Touch- Press Releases", http://www.paybytouch.com/press/html, Feb. 10, 2004, 3 pages.

"Paying It by Ear", The Guardian http://money.guardian.co.uk/creditanddebt/creditcards/story/0,1456,876908,00.html, Jan. 18, 2003, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.

"Prestige Credit Cards: Those Pricey Plastics", Changing Times, Apr. 1986.

"Shell Introduces Optional Credit Card", The Associated Press, Sep. 3, 1985.

"Shell Introducing Expanded 'Signature' Credit Card", Tulsa Business Chronical, Sep. 5, 1985.

"Shell-Oil: Introduces Shell Signature Travel and Entertainment Credit Card", Business Wire, Sep. 3, 1985.

"Smart Card Developer's Kit: Some Basic Standards for Smart Card", http://unix.be.eu.org/docs/smart-card-developer-kit/ch03/033-035.html, Feb. 9, 2004, 2 pages.

"The Chase Manhattan Bank Today Announced a Comprehensive Program to Enhance the Value of All its Credit Cards", PR Newswire, Dec. 18, 1986.

American Express to offer disposable credit card numbers, CNN.com. U.S. News, www.cnn.com/2000/US/09/08/online.payments.ap/, Sep. 8, 2000.

* cited by examiner

METHOD AND SYSTEM FOR TRACKING USER PERFORMANCE

CROSS REFERENCE TO RELATED APPLICATIONS

This application is a divisional of U.S. patent application Ser. No. 10/708,597, filed on Mar. 12, 2004 now U.S. Pat. No. 7,503,480. The '597 application is a continuation in part of U.S. Ser. No. 10/340,352 filed on Jan. 10, 2003 and entitled "SYSTEM AND METHOD FOR INCENTING PAYMENT USING RADIO FREQUENCY IDENTIFICATION IN CONTACT AND CONTACTLESS TRANSACTIONS." The '352 application itself claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 now U.S. Pat. No. 7,239,226 (which itself claims priority to U.S. Provisional No. 60/304,216 filed on Jul. 10, 2001); U.S. patent application Ser. No. 10/318,432, entitled "SYSTEM AND METHOD FOR SELECTING LOAD OPTIONS FOR USE IN RADIO FREQUENCY IDENTIFICATION IN CONTACT AND CONTACTLESS TRANSACTIONS," filed Dec. 13, 2002; U.S. patent application Ser. No. 10/318,480, entitled "SYSTEM AND METHOD FOR PAYMENT USING RADIO FREQUENCY IDENTIFICATION IN CONTACT AND CONTACTLESS TRANSACTIONS," filed Dec. 13, 2002 now U.S. Pat. No. 7,249,112; and, U.S. Provisional Patent Application No. 60/396,577 filed Jul. 16, 2002. All of the above applications are hereby incorporated by reference.

FIELD OF THE INVENTION

This invention generally relates to tracking resource performance, and more particularly, to tracking the performance of resources using Radio Frequency Identification (RFID) in contact and contactless environments.

BACKGROUND OF THE INVENTION

A variety of hardware and software applications exist which, in a limited way, allow companies to keep track of resource performance. For example, many systems exist wherein a resource (e.g., employee) manually enters in the time spent on a task on a time card or a similar reporting device. However, there is a need for coordinating time card and task reporting with project planning. Microsoft Project® is a software application that allows companies to plan and track projects in order to increase business performance and efficiency. However, most project/resource management tools require a resource to manually enter and plan a project. For example, the resource must often decide a project's scope, the kind of tasks associated with the project, the number of resources needed, and the availability of resources. Many times, the decisions are not accurate because a resource often attempts to merely predict the scope of these items. Further, if problems develop along the way, the resource typically must reschedule and try to account for the problems. Moreover, most project/resource management tools do not combine time entry with resource and task planning. Thus, a manager may assume that a resource is logging eight hours a day on a task, but in reality, the resource may only be logging five hours.

Additionally, the available project/resource management tools do not generally provide for grading or scoring of resources and/or resource efficiencies. It may be difficult, therefore, to plan the effectiveness of different resources. For example, a senior engineer may be more efficient and effective at a given task than an entry-level engineer. Further, because of the global aspect of many businesses, certain managers monitor resources located in remote places. However, most project/management tools do not offer standard criteria for grading and tracking resources to assist in remote management. Further, many project/management tools do not provide sufficient capabilities for matching a resource to tasks most-suited to the resource's skill levels.

Manual entry and project management can lead to inaccuracies in reporting and planning. While other systems exist where a resource and/or manager can interface with a software application to track progress on a task, report time, and/or project plan, these software applications still require manual interfacing. Thus, a method for instantaneous and automatic task reporting, performance tracking and project planning is desired.

In terms of automation, companies are increasingly embodying RFID data acquisition technology in a fob, token or tag for use in completing transactions. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal. U.S. Pat. No. 5,053,774 issued to Schuermann describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

One of the more visible uses of the RFID technology is found in the introduction of Exxon/Mobil's Speedpass® and Shell's EasyPay® products. These products use transponders placed in a fob or tag which enables automatic identification of the resource when the fob is presented at a Point of Sale (POS) device. Fob identification data is typically passed to a third party server database, where the identification data is referenced to a resource (e.g., resource) credit or debit account. In an exemplary processing method, the server seeks authorization for the transaction by passing the transaction and account data to an authorizing entity. Once authorization is received by the server, clearance is sent to the point of sale device for completion of the transaction. In this way, the conventional transaction processing method involves an indirect path which causes undue overhead due to the use of the third-party server. As such, a RFID system which includes instantaneous and automatic task reporting, performance tracking and project planning is desired.

SUMMARY OF THE INVENTION

A system and method for facilitating the use of RFID technology to track resource performance and task completion is disclosed. The transponder-reader system described herein may include a RFID reader operable to provide a RF interrogation signal for powering a transponder system, receiving a transponder system RF signal, and providing transponder system account data relative to the transponder system RF signal. The transponder-reader system may include a RFID protocol/sequence controller in electrical communication with one or more interrogators for providing an interrogation signal to a transponder, a RFID authentication circuit for authenticating the signal received from the transponder, a serial or parallel interface for interfacing with a point of interaction terminal, and an USB or serial interface for use in personalizing the RFID reader and/or the transponder. The transponder-reader system may further include a fob including one or more transponders (e.g., modules) responsive to one or more interrogation signals and for providing an authentication signal for verifying that the transponder and/or the RFID reader are authorized to operate within the transponder-reader system. In this way, the fob may be responsive to multiple interrogation signals provided at different frequencies. Further, the fob may include a USB or serial interface for use with a computer network or with the RFID reader.

The RFID system and method according to the present invention may include a transponder which may be embodied in a fob, tag, card or any other form factor (e.g., wristwatch, keychain, cell phone, etc.), which may be capable of being presented for interrogation. In that regard, although the transponder is described herein as embodied in a fob, the invention is not so limited.

The system may further include a RFID reader configured to send a standing RFID recognition signal which may be transmitted from the RFID reader via radio frequency (or electromagnetic) propagation. The fob may be placed within proximity to the RFID reader such that the RFID signal may interrogate the fob and initialize fob identification procedures.

In one exemplary embodiment, as a part of the identification process, the fob and the RFID reader may engage in mutual authentication. The RFID reader may identify the fob as including an authorized system transponder for receiving encrypted information and storing the information on the fob memory. Similarly, the fob, upon interrogation by the RFID reader, may identify the RFID reader as authorized to receive the encrypted and stored information. Where the RFID reader and the fob successfully mutually authenticate, the fob may transmit to the RFID reader certain information identifying the resource's performance tracking account or accounts to which the fob is associated. The RFID reader may receive the information and forward the information to facilitate performance tracking. In one exemplary embodiment, the RFID reader may forward the information to a point of interaction terminal (e.g., POI or computer interface) for transaction completion.

In another exemplary embodiment, the fob completes tasks via a computer interface. The fob may be connected to the computer using a USB or serial interface fob account information may be transferred to the computer for use in tracking a resource's performance via a network (e.g., the Internet).

In still another exemplary embodiment of the invention, a system is disclosed which enables the fob resource and/or a manager access to a resource engine, wherein the resource engine may be used to automatically grade, track, score, and assign resources based on resource skills and skill sets.

These features and other advantages of the system and method, as well as the structure and operation of various exemplary embodiments of the system and method, are described below.

BRIEF DESCRIPTION OF DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1A:
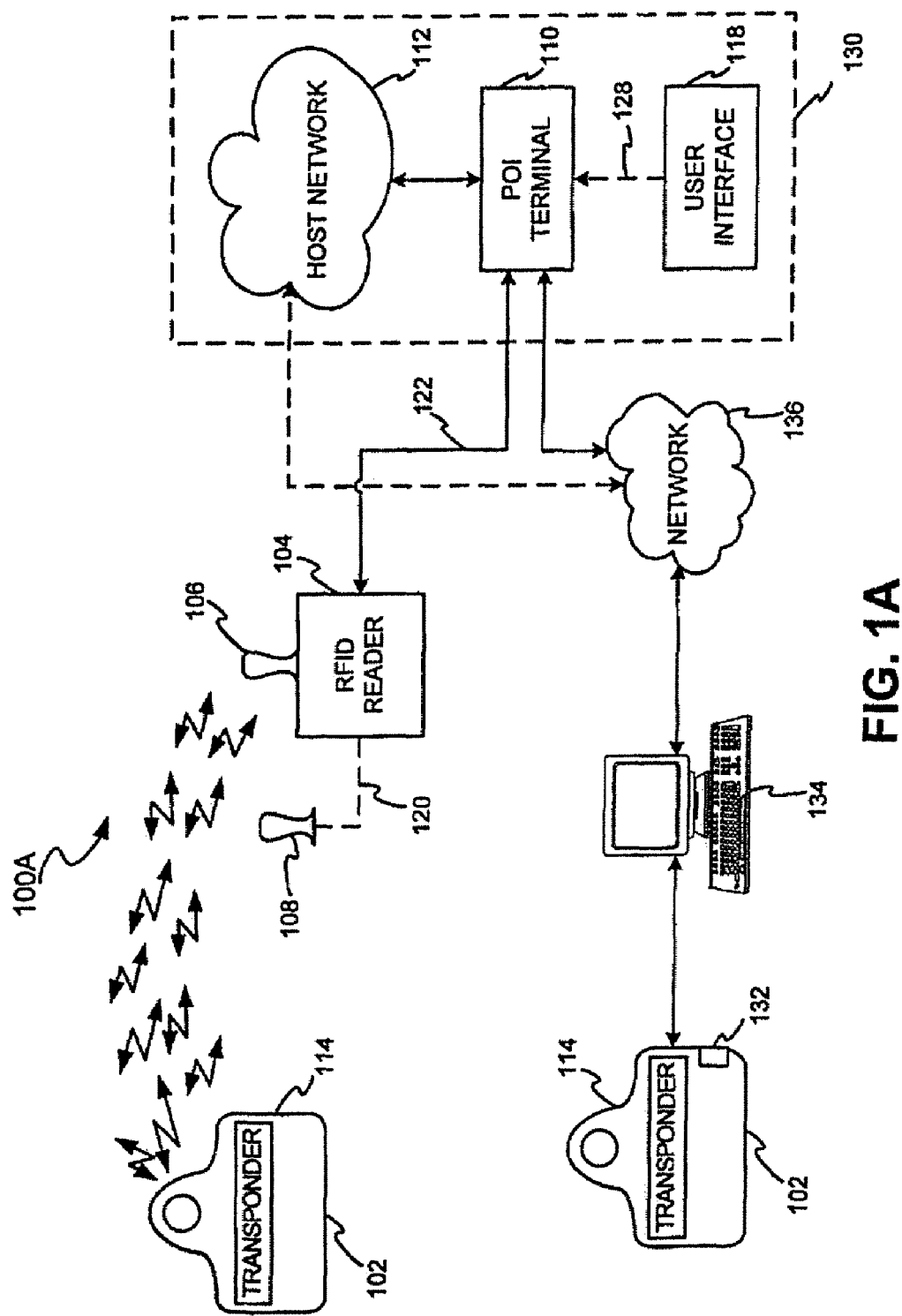
FIG. 1A illustrates an exemplary RFID-based system in accordance with the present invention, wherein exemplary components used for fob performance tracking are depicted.

The detailed description of exemplary embodiments of the invention herein makes reference to the accompanying block diagrams and flowcharts, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may be described herein in terms of block diagrams, screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or tracking resource performance, such as a distributed system, a thin cable network, an Ethernet, a token ring network, the internet, an intranet, an extranet, wide area network (WAN), local area network (LAN), satellite communications, and/or the like. It is noted that the network may be implemented as other types of networks, such as an interactive television network (ITN).

The system user/resource may interact with the system via any input device such as, a keypad, keyboard, mouse, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates, the use, sale, or distribution of any goods, services or information over any network having similar functionality described herein.

FIG. 1A illustrates an exemplary RFID performance tracking transaction system 100A in accordance with the present invention, wherein exemplary components for use in completing a fob transaction are depicted. In general, the operation of system 100A may begin when a fob 102 is presented for tracking a resource's performance, and is interrogated by an RFID reader 104 or, alternatively, a computer interface (e.g., user interface) 134. Fob 102 and RFID reader 104 may then engage in mutual authentication after which the transponder 114 may provide the transponder identification and/or account identifier to RFID reader 104 which may further provide the information to a resource engine 130 via a point of interaction terminal 110. For further information related to tracking and optimizing resources, see, for example, U.S. patent application Ser. No. 10/770,684 filed Feb. 3, 2004, and entitled "SYSTEM AND METHOD FOR RESOURCE OPTIMIZATION", which is hereby incorporated by reference.

As used herein, a resource may include any user, person, employee, employer officer, entity, manager, business, client, corporation, customer, contractor, administrator, operator, equipment, supply, package, machinery, hardware and/or software. Employer, as used herein, may include any performance tracking entity, manager, controller, administrator, operator and/or company.

The term tracking as used herein, may include any management, assignment, grading, scoring, manipulation, tracking, control, allocation, and/or any other modification to application information, resource information, skills information, and/or task information. Tasks may include shipments, assignments, problem tickets, enhancements, analyses, builds, designs, components, assemblies, and/or any other projects.

Resource engine 130 may be a stand-alone system or incorporated into any pre-existing network or metrics system via any software and/or hardware customization or upgrades. Resource engine 130 may include any hardware and/or software discussed herein. Resource engine 130 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including resource data, application data, skill data, category data and/or like data that could be used in association with the present invention. As those skilled in the art will appreciate, resource engine 130 computer will typically include an operating system (e.g., Windows NT, 95/98/2000, Linux, Solaris, etc.) as well as various conventional support software and drivers typically associated with computers.

Resource engine 130 may also be used in conjunction with any monitoring system, hardware or software, configured to monitor, manage and track systems within resource engine 130. One example of such monitoring system is an off-the-shelf program such as IBM's Tivoli NetView®, which automatically detects problems and responds to those problems at a local level. For example, NetView may detect a problem with an application and generate an information management record (IMR) in conjunction with that problem. The IMR from the monitoring system may then be transmitted to resource engine 130 through any of the communications networks described herein.

Similarly, resource engine 130 may include, or be used in conjunction with, any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, the invention may be implemented using TCP/IP communications protocols, IPX, Appletalk, IP-6, NetBIOS, OSI or any number of existing or future protocols. Resource engine 130 will be discussed in greater detail herein.

System 100A may include fob 102 having a transponder 114 and RFID reader 104 in RF communication with fob 102. Although the present invention is described with respect to fob 102, the invention is not to be so limited. Indeed, system 100A may include any device having a transponder which is configured to communicate with RFID reader 104 via RF communication. Typical devices may include, for example, a key ring, tag, card, cell phone, wristwatch or any such form capable of being presented for interrogation.

RFID reader 104 may be configured to communicate using an RFID internal antenna 106. Alternatively, RFID reader 104 may include an external antenna 108 for communications with fob 102, where the external antenna may be made remote to RFID reader 104 using a suitable cable and/or data link 120. RFID reader 104 may be further in communication with resource engine 130 via a data link 122. System 100A may include a transaction completion system including a point of interaction device such as, for example, employer point of interaction terminal 110 or computer 134. In one exemplary embodiment the transaction completion system may include resource engine 130 and/or point of interaction terminal 110 in communication with RFID reader 104 (via data link 122). As described more fully below, the transaction completion system may include computer 134 connected to a network 136 and to transponder 114 via a USB connector 132.

Although the point of interaction (POI) is described herein with respect to a resource POI terminal, the invention is not to be so limited. Indeed, a POI terminal is used herein by way of example, and the POI may be any device capable of receiving fob account data. In this regard, the POI may be any point of interaction device and/or terminal enabling the resource to complete a performance tracking transaction using fob 102. POI terminal 110 may be in further communication with a user interface 118 (via data link 128) for providing a resource and/or manager access to resource engine 130 information. In addition, POI terminal 110 may be in communication with an employer host network 112 (via data link 124) for processing any tracking request. In this arrangement, information provided by RFID reader 104 is provided to POI terminal 110 of resource engine 130 via data link 122. POI terminal 110 may receive the information (and alternatively may receive any identity verifying information from user interface 118 via data link 128) and provide the information to host network 112 for processing.

A variety of conventional communications media and protocols may be used for data links 120, 122, 124, and 128 as well as for any other communication links mentioned herein. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, resource engine 130, including POI terminal 110 and host network 112, may reside on a local area network which interfaces to a remote network (not shown) for remote authorization of an intended performance tracking transaction. Host network 112 may be an employer network, such as an employer LAN, WAN and/or intranet. Resource engine 130 may communicate with the remote network via a leased line, such as a T1, D3 line, or the like. Such communications lines are described in a variety of texts, such as, "Understanding Data Communications," by Gilbert Held, which is incorporated herein by reference.

A transponder and/or account identifier, as used herein, may include any number or identifier for an account (e.g., any device, code, or other identifier/indicia suitably configured to allow a resource to interact or communicate with system 10A, such as, for example, authorization/access code, personal identification number (PIN), Internet code, digital certificate, biometric data, and/or other identification indicia). A transponder identifier may be further coordinated with fob 102 as well as a resource identifier. For example, a resource may have a resource account identifier associated with him. The resource may also carry fob 102, which can only be used by that specific resource. Fob 102, in turn has a unique transponder identifier such that the transponder identifier may be associated with both the specific fob 102 and the resource holding fob 102.

Resource engine 130 may also have one or more employer account identifiers associated with it. An employer account identifier may be used by an employer to associate a resource and/or fob 102 with a specific employer account. For example, the employer account identifiers may be used to track a resource's performance on different tasks associated with the employer accounts.

The transponder identifier may be maintained by a performance tracking provider (e.g., employer) and which may be used to track a resource's performance. A typical transponder identifier (e.g., account data) may be correlated to a resource number, identifier, etc. For ease in understanding, the present invention may be described with respect to a resource ID. However, it should be noted that the invention is not so limited and other accounts permitting an exchange of information for an account data value is contemplated to be within the scope of the present invention.

The transponder identifier may be distributed and stored in any form of plastic, electronic, magnetic, and/or optical device capable of transmitting or downloading data to a second device. A resource account identifier may be, for example, a resource's ten-digit social security number. The resource account identifier may also be, for example, the number of the resource's company credit card. In one exemplary embodiment, the transponder and/or resource account identifier may include a unique fob serial number and resource identification number, as well as specific application applets. The transponder and/or resource account identifiers may be stored in fob 102 inside a database 214, as described more fully below. Database 214 may be configured to store multiple account identifiers issued to fob 102 resources by the same or different account providing institutions.

Figure 2:
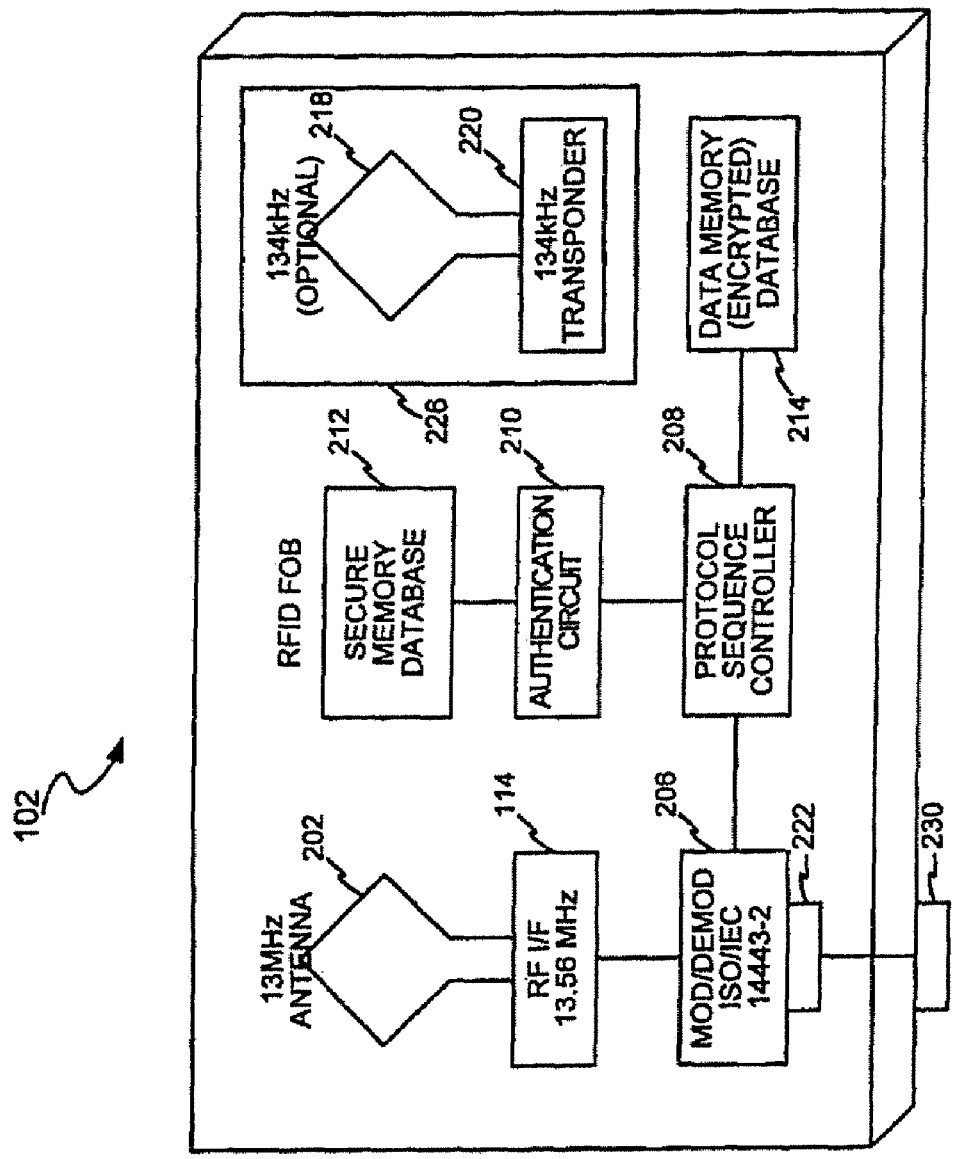
FIG. 2 is a schematic illustration of an exemplary fob in accordance with the present invention.

FIG. 2 illustrates the many functions of exemplary fob 102 in accordance with the present invention. Fob 102 may be an RFID fob which may be presented by the resource to facilitate an exchange of information, for tracking a resource's performance on one or more tasks. As described herein, by way of example, fob 102 may be an RFID fob which may be presented for facilitating tracking resource performance.

Fob 102 may include an antenna 202 for receiving an interrogation signal from RFID reader 104 via antenna 106 (or alternatively, via external antenna 108). Fob antenna 202 may be in communication with transponder 114. In one exemplary embodiment, transponder 114 may be a 13.56 MHz transponder compliant with the ISO/IEC 14443 standard, and antenna 202 may be of the 13 MHz variety. The transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of fob 102 transponder identifier. In this regard, protocol/sequence controller 208 may be any suitable digital or logic driven circuitry capable of facilitating determination of the sequence of operation for fob 102 inner-circuitry. For example, protocol/sequence controller 208 may be configured to determine whether the signal provided by RFID reader 104 is authenticated, and thereby providing to RFID reader 104 the account identifier stored on fob 102.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from RFID reader 104.

In addition, protocol/sequence controller 208 may be in communication with a database 214 for storing at least fob 102 transponder account data, and a unique fob 102 identification code. Protocol/sequence controller 208 may be configured to retrieve the account identifier from database 214 as desired. Database 214 may be of the same configuration as database 212 described above. The fob transponder account data and/or unique fob identification code stored on database 214 may be encrypted prior to storage. Thus, where protocol/sequence controller 208 retrieves the account data, and or unique fob identification code from database 214, the transponder account identifier may be encrypted when being provided to RFID reader 104. Further, the data stored on database 214 may include, for example, an unencrypted unique fob 102 identification code, a resource identification, Track 1 and 2 data, as well as specific application applets.

Database 212 and any other database discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables may be preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, for example, storing individual files using an ISO/IEC 7816-4 file structure; implementing a domain whereby a dedicated file may be selected that exposes one or more elementary files containing one or more data sets; using data sets stored in individual files using a hierarchical filing system; data sets stored as records in a single file (for example, compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats may be facilitated by storing the information as a Block of Binary (BLOB). Thus, any binary information may be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with a wide variety of system components by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that may be stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the network. The annotation may comprise a short header, trailer, or other appropriate indicator related to each data set that may be configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the resource, user, account identifier or the like. Each of these condition annotations are further discussed herein.

With reference again to the exemplary block diagrams illustrated in FIGS. 1 and 2, fob 102 may be configured to respond to multiple interrogation frequency transmissions provided by RFID reader 104. That is, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where antenna 218 and transponder 220 are compatible with at least one of the additional RF signals provided by RFID reader 104. For example, in one exemplary embodiment, fob 102 may include a 134 KHz antenna 218 configured to communicate with a 134 KHz transponder 220. In this exemplary configuration, an ISO/IEC 14443-2 compliant modulator/demodulator may not be required. Instead, the 134 KHz transponder may be configured to communicate directly with the protocol/sequence controller 208 for transmission and receipt of authentication and account identifier signals as described above.

In another embodiment, fob 102 may further include a universal serial bus (USB) connector 132 for interfacing fob 102 to user interface 134. User interface 134 may be further in communication with POI terminal 110 via a network 136. Network 136 may be the Internet, an intranet, or the like as is described above with respect to network 112. Further, user interface 134 may be similar in construction to any conventional input devices and/or computing systems aforementioned for permitting a resource to interact with network 136 and/or resource engine 130 through user interface 134. In one exemplary embodiment, fob 102 may be configured to facilitate online performance tracking. A USB converter 222 may be in communication with a USB connector 232 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes USB connector 132, fob 102 may be in communication with, for example, a USB port on user interface 134. The information retrieved from fob 102 may be compatible with employee badge and/or smart card technology enabling usage of interactive applications on the Internet. No RFID reader may be required in this embodiment since the connection to POI terminal 110 may be made using a USB port on user interface 134 and network 136.

Fob 102 may include means for enabling activation of the fob by the resource. In one exemplary embodiment, a switch 230 which may be operated by the user/resource of fob 102. Switch 230 on fob 102 may be used to selectively or inclusively activate fob 102 for particular uses. In this context, the term "selectively" may mean that switch 230 enables the resource to place fob 102 in a particular operational mode. For example, the resource may place fob 102 in a mode for enabling tracking the resource's performance of a specific task using a selected task number. Alternatively, the fob may be placed in a mode as such that the fob account identifier is provided by USB port 132 (or serial port) only and fob transponder 114 is disabled. In addition, the term "inclusively" may mean that fob 102 is placed in an operational mode permitting fob 102 to be responsive to the RF interrogation and interrogation via the USB connector 132. In one particular embodiment, switch 230 may remain in an OFF position ensuring that one or more applications or accounts associated with fob 102 are non-reactive to any commands issued by RFID reader 104. As used herein, the OFF position may be termed the "normal" position of the activation switch 230, although other normal positions are contemplated.

In another exemplary embodiment, when switch 230 is moved from the OFF position, fob 102 may be deemed activated by the resource. That is, switch 230 may activate internal circuitry in fob 102 for permitting the fob to be responsive to RF signals (e.g., commands from RFID reader 104). In this way, switch 230 may facilitate control of the active and inactive states of fob 102. Such control increases the system security by preventing inadvertent or illegal use of fob 102.

In one exemplary embodiment, switch 230 may be a simple mechanical device in communication with circuitry which may electrically prevent the fob from being powered by a RFID reader. That is, when switch 230 is in its normal position, switch 230 may provide a short to fob 102 internal circuitry, preventing fob 102 from being responsive to interrogation by RF or via the USB connector 230. In this arrangement, switch 230 may be, for example, a "normally closed" (NC) configured switch, which may be electrically connected to antenna 202 at the interface of antenna 202 and transponder 114. Switch 230 may be depressed, which may open switch 230 fully activating antenna 202.

In yet another exemplary embodiment, fob 102 may include a biometric sensor and biometric membrane configured to operate as switch 230 and activate fob 102 when provided with a biometric signal from a authorized resource using fob 102. Such biometric signal may be the digital reading of a fingerprint, thumbprint, or the like. Typically, where biometric circuitry is used, the biometric circuitry may be powered by an internal voltage source (e.g., battery). In this case, the switch may not be a simple mechanical device, but a switch which is powered. In yet another exemplary embodiment, switch 230 may be battery powered though no biometric circuitry is present in fob 102.

In yet another embodiment, switch 230 may be a logic switch. Where switch 230 is a logic switch, switch 230 control software may be read from the sequence controller 208 to selectively control the activation of the various fob 102 components.

Figure 3:
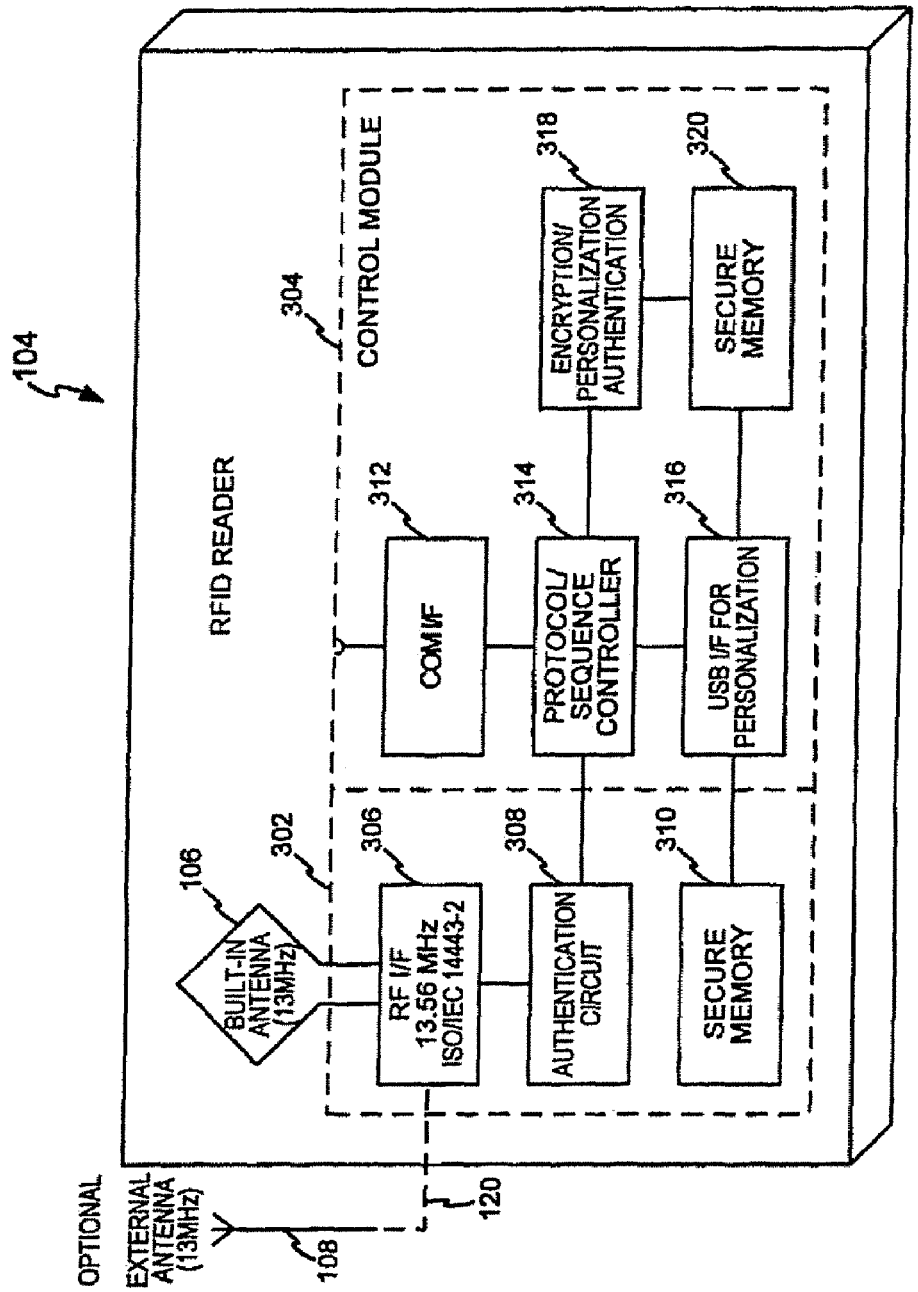
FIG. 3 is a schematic illustration of an exemplary RFID reader in accordance with the present invention.

FIG. 3 illustrates an exemplary block diagram of RFID reader 104 in accordance with an exemplary embodiment of the present invention. RFID reader 104 includes, for example, an antenna 106 coupled to a RF module 302, which is further coupled to a control module 304. In addition, RFID reader 104 may include antenna 108 positioned remotely from RFID reader 104 and coupled to RFID reader 104 via a suitable cable 120, or other wire or wireless connection.

RF module 302 and antenna 106 may be suitably configured to facilitate communication with fob 102. Where fob 102 is formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate using a 13.56 MHz frequency. RFID reader 104 may include two receivers which may operate using the 134 kHz frequency, the 13.56 MHz frequency or both. When RFID reader 104 is operating at 134 kHz frequency, only operation with the 134 kHz module on fob 102 may be possible. When reader 104 is operating at the 13.56 MHz frequency, only operation with the 13.56 MHz module on fob 102 may be possible. Where RFID reader 104 supports both a 134 kHz frequency and a 13.56 MHz RF module, fob 102 may receive both signals from RFID reader 104. In this case, fob 102 may be configured to prioritize selection of the one or the other frequency and reject the remaining frequency. Alternatively, RFID reader 104 may receive signals at both frequencies from the fob upon interrogation. In this case, RFID reader 104 may be configured to prioritize selection of one or the other frequency and reject the remaining frequency.

Further, a protocol/sequence controller 314 may include an optional feedback function for notifying the resource of the status of a particular performance tracking transaction. For example, the optional feedback may be in the form of an LED, LED screen and/or other visual display which is configured to light up or display a static, scrolling, flashing and/or other message and/or signal to inform a resource using fob 102 that a performance tracking transaction is initiated (e.g., fob is being interrogated), the fob is valid (e.g., fob is authenticated), a performance tracking transaction is being processed, (e.g., fob transponder account identifier is being read by RFID reader) and/or the transaction is accepted or denied (e.g., account identifiers approved or disapproved). Such an optional feedback may or may not be accompanied by an audible indicator (or may present the audible indicator singly) for informing fob 102 resource of the performance tracking transaction status. The audible feedback may be a simple tone, multiple tones, musical indicator, and/or voice indicator configured to signify when the fob 102 is being interrogated, the performance tracking transaction status, or the like.

RFID antenna 106 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 106 in similar manner as was described with respect to fob transponder 114. For example, where transponder 306 is 13.56 MHz RF rated antenna 106 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to fob 102 which may be used to authorize the tracking of resource performance over system 100. Database 310 may additionally store RFID reader 104 identifying information and/or provide such information to fob 102 for use in authenticating whether RFID reader 104 is authorized to be provided the fob transponder account identifier stored on fob database 214.

Authentication circuitry 308 may be of similar description and operation as authentication circuitry 210. That is, authentication circuitry 308 may be configured to authenticate the signal provided by fob 102 in a similar manner that authentication circuitry 210 may be configured to authenticate the signal provided by RFID reader 104. As is described more fully below, fob 102 and RFID reader 104 engage in mutual authentication. In this context, "mutual authentication" may mean that operation of the system 100 may not take place until fob 102 authenticates the signal from RFID reader 104, and RFID reader 104 authenticates the signal from fob 102.

Figure 4:
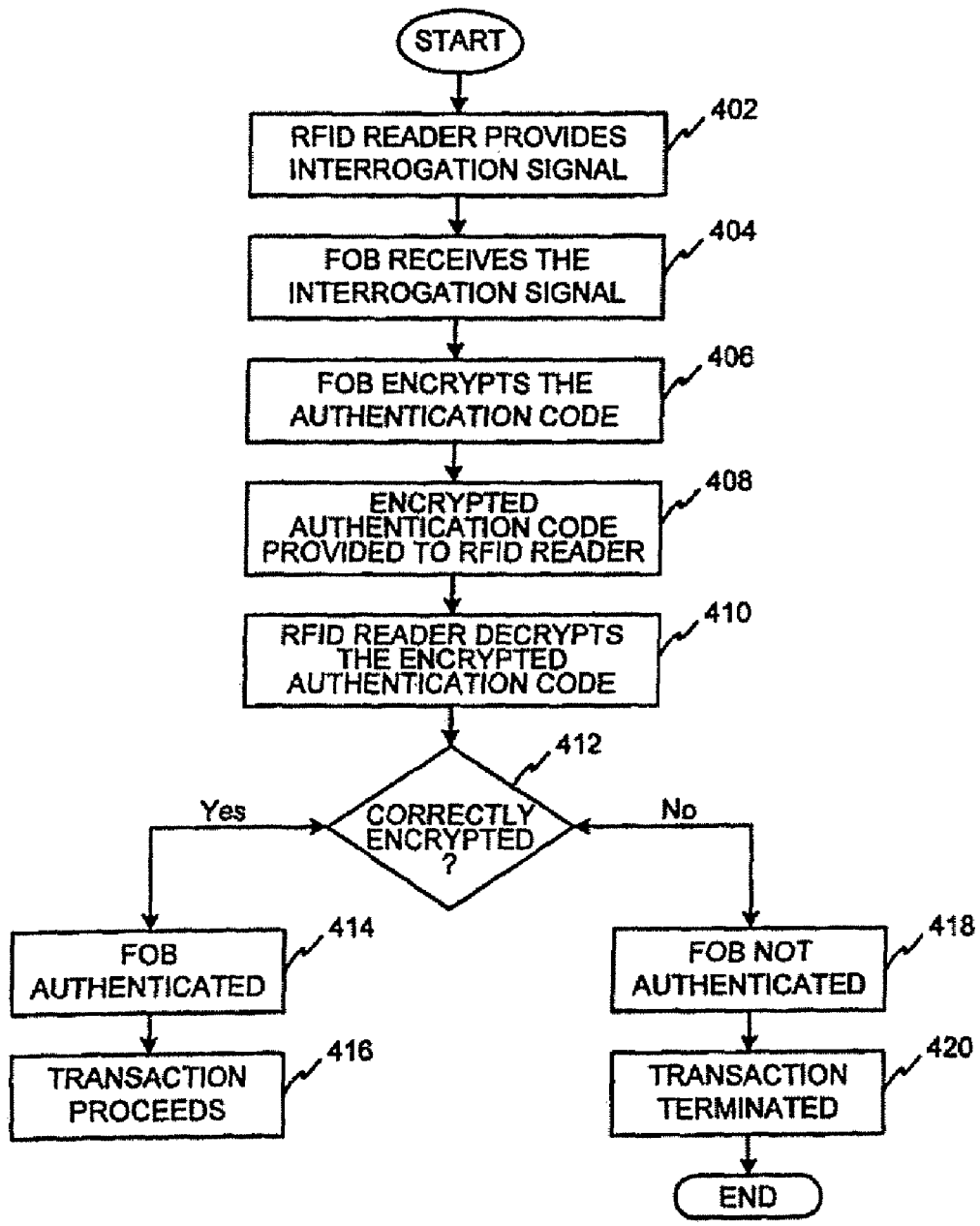
FIG. 4 is an exemplary flow diagram of an exemplary authentication process in accordance with the present invention.

FIG. 4 depicts a flowchart of an exemplary authentication process in accordance with the present invention. The authentication process is depicted as one-sided. That is, the flowchart depicts the process of RFID reader 104 authenticating fob 102, although similar steps may be followed in the instance that fob 102 authenticates RFID reader 104.

As noted, database 212 may store security keys for encrypting or decrypting signals received from RFID reader 104. In an exemplary authentication process, where RFID reader 104 is authenticating fob 102, RFID reader 104 may provide an interrogation signal to fob 102 (step 402). The interrogation signal may include a random code generated by the RFID reader authentication circuit 210, which is provided to fob 102 and which is encrypted using an unique encryption key corresponding to the unique fob 102 identification code. For example, protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which is recognizable (e.g., readable) by RFID reader 104 and fob 102. The authentication code may be provided to fob 102 via the RFID RF interface 306 and antenna 106 (or alternatively antenna 108).

Fob 102 receives the interrogation signal (step 404). The interrogation signal including the authorization code may be received at RF interface 114 via antenna 202. Once fob 102 is activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of fob 102, and provide the authentication code to authentication circuit 210. The fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to RFID reader 104 (step 408). That is, the encrypted authentication code may be provided to RFID reader 104 via modulator/demodulator circuit 206, RF interface 114 (e.g., transponder 114) and antenna 106.

RFID reader 104 may then receive the encrypted authentication code and decryption it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on the unique fob 102 identification code. For example, the encrypted authentication code may be provided along with the unique fob 102 identification code. The authentication circuit may receive the unique fob 102 identification code and retrieve from database 310 a transponder system decryption key correlative to the unique fob 102 identification code for use in decrypting the encrypted authentication code.

Once the authentication code is decrypted, the decrypted authentication code is compared to the authentication code provided by RFID reader 104 at step 402 (step 412) to verify its authenticity. If the decrypted authorization code is not readable (e.g., recognizable) by the authentication circuit 308, fob 102 is deemed to be unauthorized (e.g., unverified) (step 418) and the operation of system 100 is terminated (step 420). Contrarily, if the decrypted authorization code is recognizable (e.g., verified) by fob 102, the decrypted authorization code is deemed to be authenticated (step 414), and the transaction is allowed to proceed (step 416). In one particular embodiment, the proceeding transaction may mean that fob 102 may authenticate RFID reader 104 prior to RFID reader 104 authenticating fob 102, although, it should be apparent that RFID reader 104 may authenticate fob 102 prior to fob 102 authenticating RFID reader 104.

It should be noted that in an exemplary verification process, authorization circuit 308 may determine whether the unlocked authorization code is identical to the authorization code provided in step 402. If the codes are not identical then fob 102 is not authorized to access system 100. Although, the verification process is described with respect to identicality, identicality is not required. For example, authentication circuit 308 may verify the decrypted code through any protocol, steps, or process for determining whether the decrypted code corresponds to authorized fob 102.

Figure 5:
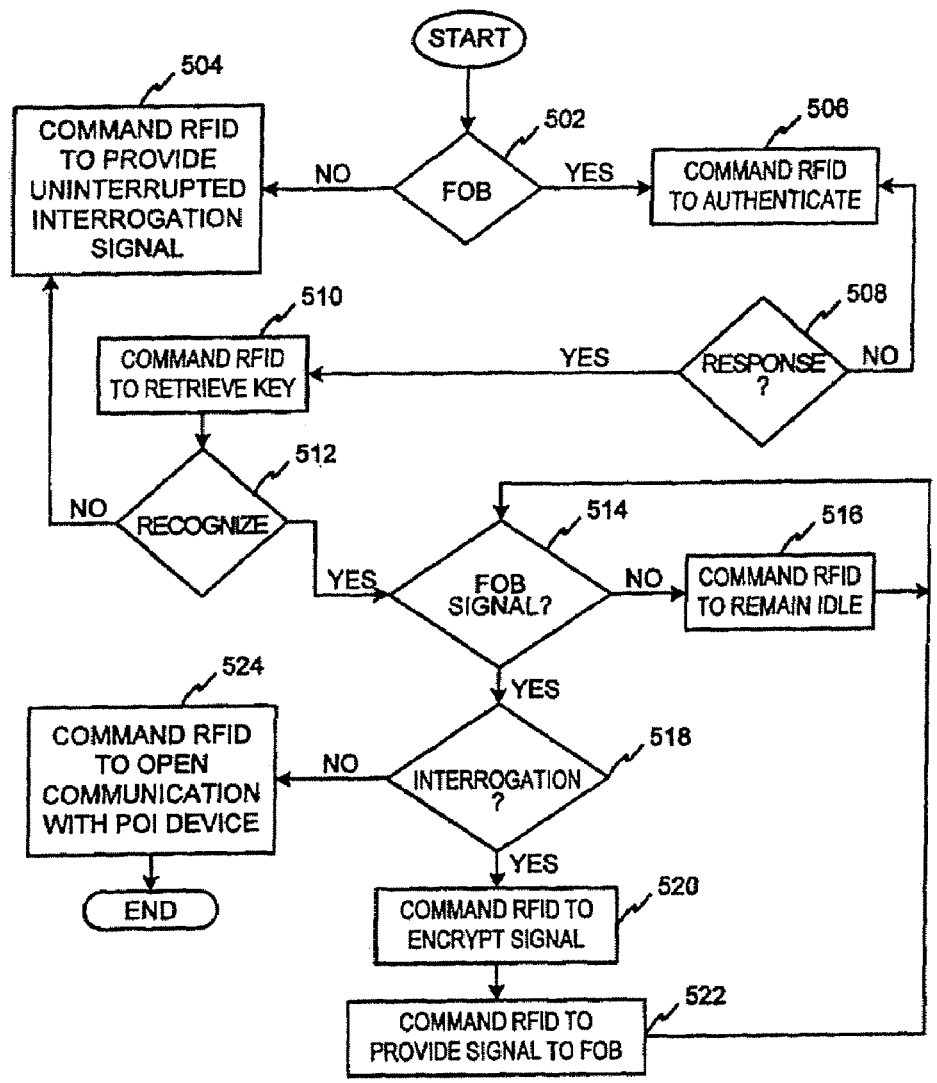
FIG. 5 is an exemplary flow diagram of an exemplary decision process for a protocol/sequence controller in accordance with the present invention.

Authentication circuitry 308 may additionally be in communication with protocol/sequence controller 314 of similar operation and description as protocol/sequence controller 208 of FIG. 2. That is, protocol/sequence device controller 314 may be configured to determine the order of operation of RFID reader 104 components. For example, FIG. 5 illustrates and exemplary decision process under which protocol/sequence controller 314 may operate. Protocol/sequence controller 314 may command the different components of RFID reader 104 based on whether fob 102 is present (step 502). For example, if fob 102 is not present, then protocol/sequence controller 314 may command RFID reader 104 to provide an uninterrupted interrogation signal (step 504). That is, protocol/sequence controller 314 may command authentication circuit 308 to provide an uninterrupted interrogation signal until the presence of fob 102 is realized. If fob 102 is present, the protocol/sequence controller 314 may command RFID reader 104 to authenticate fob 102 (step 506).

As noted above, authentication may mean that protocol/sequence controller 314 may command authentication circuit 308 to provide fob 102 with an authorization code. If a response is received from fob 102, protocol/sequence controller may determine if the response is a response to RFID reader 104 provided authentication code, or if the response is a signal requiring authentication (step 508). If the signal requires authentication, then protocol/sequence controller 314 may activate the authentication circuit as described above (step 506). On the other hand, if fob 102 signal is a response to the provided authentication code, then protocol/sequence controller 314 may command RFID reader 104 to retrieve the appropriate security key for enabling recognition of the signal (step 510). That is, protocol/sequence controller 314 may command authentication circuit 308 to retrieve from database 310 a security key (e.g., transponder system decryption key), unlock the signal, and compare the signal to the signal provided by RFID reader 104 in the authentication process (e.g., step 506). If the signal is recognized, protocol/sequence controller 314 may determine that fob 102 is authorized to access system 100. If the signal is not recognized, then fob 102 is considered not authorized. In which case, protocol/sequence controller 314 may command the RFID controller to interrogate for authorized fobs (step 504).

Once protocol/sequence controller 314 determines that fob 102 is authorized, protocol/sequence controller 314 may seek to determine if additional signals are being sent by fob 102 (step 514). If no additional signal is provided by fob 102, then protocol/sequence controller 314 may provide all the components of RFID reader 104 to remain idle until such time as a signal is provided (step 516). Contrarily, where an additional fob 102 signal is provided, protocol/sequence controller 314 may determine if fob 102 is requesting access to resource engine 130 POI terminal 110 or if fob 102 is attempting to interrogate RFID reader 104 for return (e.g., mutual) authorization (step 518). Where fob 102 is requesting access to resource engine 130 POI terminal 110, protocol/sequence controller 314 may command RFID reader 104 to open communications with POI terminal 110 (step 524). In particular, protocol/sequence controller 314 may command POI terminal communications interface 312 to become active, permitting transfer of data between RFID reader 104 and resource engine 130 POI terminal 110.

On the other hand, if protocol/sequence controller determines that fob 102 signal is a mutual interrogation signal, then protocol/sequence controller 314 may command RFID reader 104 to encrypt the signal (step 520). Protocol/sequence controller 314 may command encryption authentication circuit 318 to retrieve from database 320 the appropriate encryption key in response to fob 102 mutual interrogation signal. Protocol/sequence controller 314 may then command RFID reader 104 to provide the encrypted mutual interrogation signal to fob 102. Protocol/sequence controller 314 may command authentication circuit 318 to provide an encrypted mutual interrogation signal for fob 102 to mutually authenticate. Fob 102 may then receive the encrypted mutual interrogation signal and retrieve from authentication circuitry 212 a RFID reader decryption key.

Although an exemplary decision process of protocol/sequence controller 314 is described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device is so connected.

Encryption/decryption component 318 may be further in communication with a secure account identifier database 320 which stores the security keys necessary for decrypting the encrypted fob account identifier. Upon appropriate request from protocol/sequence controller 314, encryption/decryption component (e.g., circuitry 318) may retrieve the appropriate security key, decrypt the fob account identifier and forward the decrypted account identifier to protocol/sequence controller 314 in any format readable by any later connected POI terminal 110. In one exemplary embodiment, the account identifier may be forwarded in a conventional magnetic stripe card format compatible with the ISO/IEC 7813 standard. That is, in accordance with the invention, there is no need to translate or correlate the account identifier to traditional magnetic stripe format as is done with the prior art. The invention processes the performance tracking transaction request directly, as if the card associated with the account has been presented for performance tracking.

Upon receiving the account identifier in magnetic stripe format, protocol/sequence controller 314 may forward the account identifier to POI terminal 110 via communications interface 312 and data link 122, as best shown in FIG. 1. Performance tracking terminal 110 may receive the decrypted account identifier and forward the magnetic stripe formatted account identifier to host network 112 for processing under the employer's business as usual standard. In this way, the present invention eliminates the need of a third-party server. Further, where POI terminal 110 receives a response from host network 112 (e.g., performance tracking authorized or denied), protocol/sequence controller 314 may provide the network response to RF module 302 for optically and/or audibly communicating the response to fob 102 resource.

RFID reader 104 may additionally include USB interface 316, in communication with the protocol/sequence controller 314. In one embodiment, the USB interface may be a RS22 serial data interface. Alternatively, RFID reader 104 may include a serial interface such as, for example, a RS232 interface in communication with protocol/sequence controller 314. USB connector 316 may be in communication with a personalization system 116 (shown in FIG. 1B) for initializing RFID reader 104 to system 100 application parameters. That is, prior to operation of system 100, RFID reader 104 may be in communication with personalization system 116 for populating database 310 with a listing of security keys belonging to authorized fobs 102, and for populating database 320 with the security keys to decrypt fob 102 account identifiers placing the account identifiers in ISO/IEC 7813 format. In this way, RFID reader 104 may be populated with a unique identifier (e.g., serial number) which may be used by fob authentication circuitry 210 to determine if RFID reader 104 is authorized to receive fob 102 encrypted account identifier.

Figure 1B:
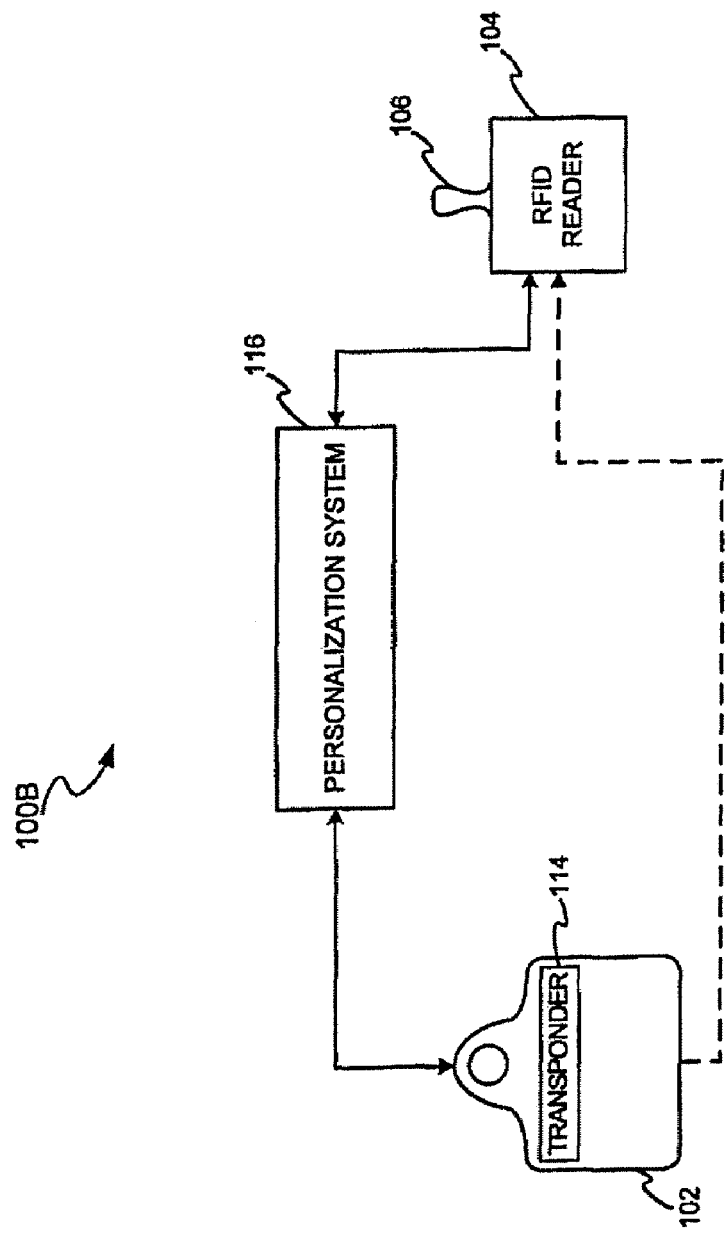
FIG. 1B illustrates an exemplary personalization system in accordance with the present invention.

FIG. 1B illustrates an exemplary personalization system 100B, in accordance with the present invention. In general, typical personalization system 100B may be any system for initializing RFID reader 104 and fob 102 for use in system 100A. With reference to FIG. 1B, the similar personalization process for fob 102 may be illustrated. For example, personalization system 116 may be in communication with fob 102 via RF ISO/IEC 14443 interface 114 for populating fob database 212 with the security keys for facilitating authentication of the unique RFID reader 104 identifier. In addition, personalization system 116 may populate on database 212 a unique fob 102 identifier for use by RFID reader 104 in determining whether fob 102 is authorized to access system 100. Personalization system 116 may populate (e.g., inject) the encrypted fob 102 account identifier into fob database 214 for later providing to an authenticated RFID reader 104.

In one exemplary embodiment, personalization system 116 may include any standard computing system as described above. For example, personalization system 116 may include a standard personal computer containing a hardware security module operable using any conventional graphic user interface. Prior to populating the security key information account identifier and unique identifying information into fob 102 or RFID reader 104, the hardware security module may authenticate fob 102 and RFID reader 104 to verify that the components are authorized to receive the secure information.

In another exemplary embodiment, resource engine 130 may be configured to facilitate implementing the functions of personalization system 116. For example, resource engine 130 may be configured as personalization system 116. Thus resource engine 130 may be in communication with fob 102 via RF ISO/IEC 14443 interface 114 for populating fob database 212 with the security keys for facilitating authentication of the unique RFID reader 104 identifier. In addition, resource engine 130 may populate on database 212 a unique fob 102 identifier for use by RFID reader 104 in determining whether fob 102 is authorized to access system 100. Resource engine 130 may further populate (e.g., inject) the encrypted fob 102 account identifier into fob database 214 for later providing to an authenticated RFID reader 104.

Figure 6A:
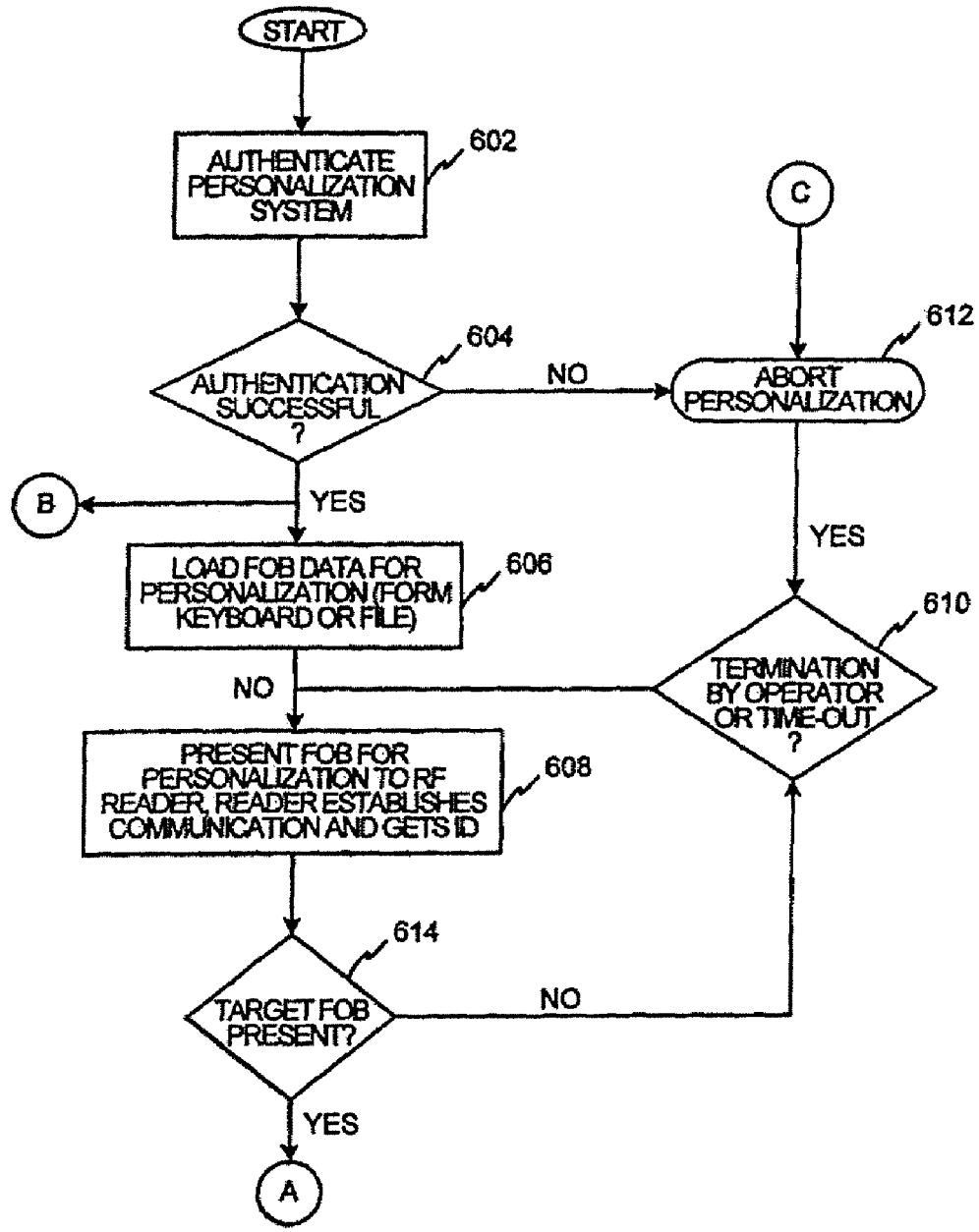
FIGS. 6A and 6B are an exemplary flow diagram of a fob personalization process in accordance with the present invention.
Figure 6B:
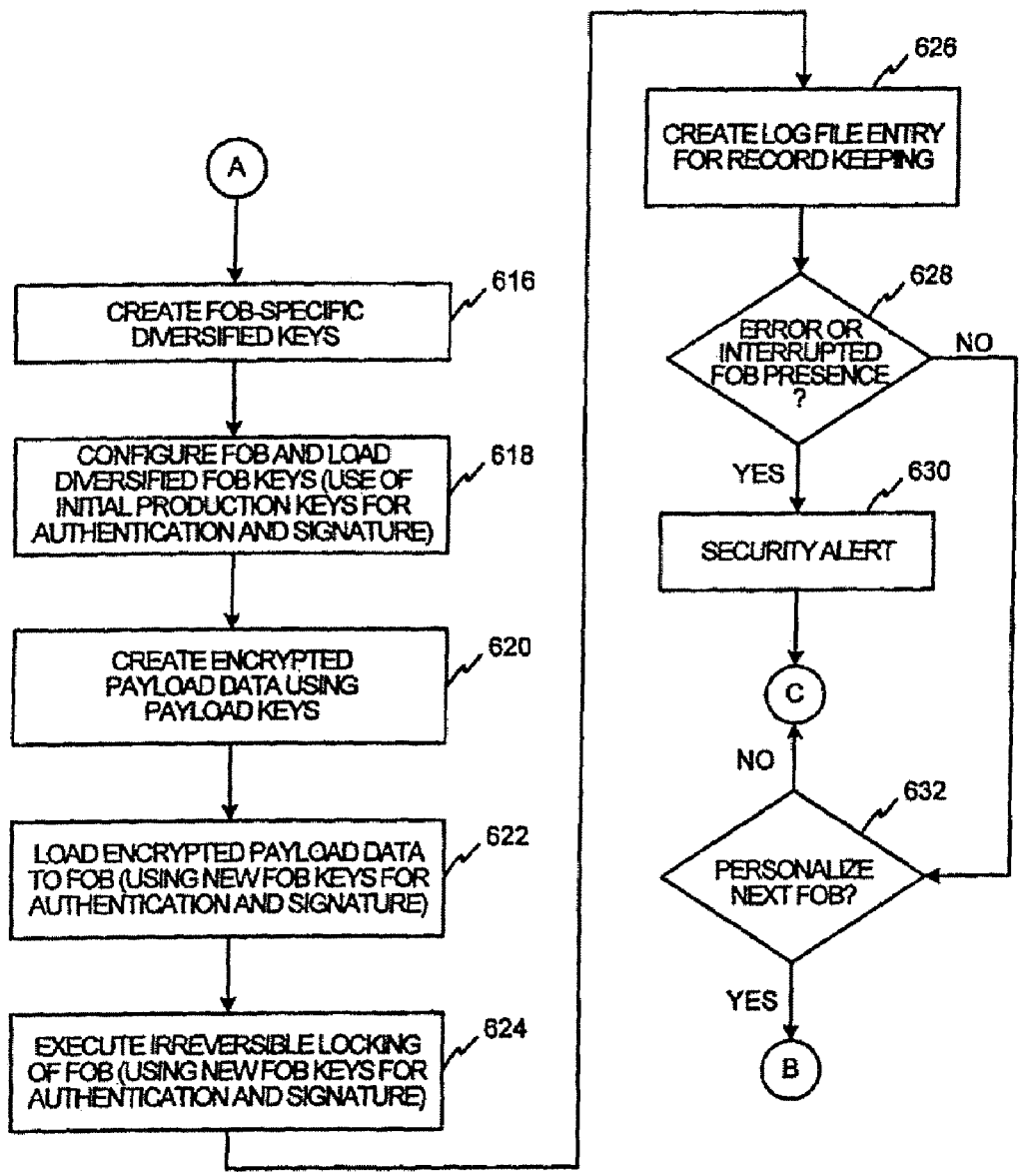

FIGS. 6A and 6B illustrate an exemplary flowchart of a personalization procedure which may be used to personalize fob 102 and/or RFID reader 104. Although the following description discusses mainly personalization of fob 102, RFID reader 104 may be personalized using a similar process. The personalization process, which occurs between personalization system 116 and the device to be personalized (e.g., fob 102 or RFID reader 104), may begin, for example at step 602. Mutual authentication may occur between personalization system 116 and the device to be authenticated in much the same manner as was described above with regard to fob 102 mutually authenticating with RFID reader 104. That is, personalization system 116 may transmit a personalization system 116 identifier to the device to be authenticated which is compared by the device authentication circuitry 210, 308 against personalization system identifiers stored in the device database 212, 310. Where a match does not occur (step 604), the personalization process may be aborted (step 612). Where a match occurs (step 604), personalization system 116 may prepare a personalization file to be provided to the device to be personalized (step 606). If personalization system 116 is operated manually, the personalization file may be entered into personalization system 116 using any suitable system interface such as, for example, a keyboard (step 606). Where personalization system 116 operator elects to delay the preparation of the personalization files, personalization system 116 may abort the personalization process (step 610). In this context, the personalization file may include the unique fob 102 or RFID reader 104 identifier, security key for loading into database 212 and 310, and/or security keys for decrypting a fob transponder account identifier which may be loaded in database 320.

Fob 102 may be personalized by direct connection to personalization system 116 via RF ISO/IEC 14443 interface 114, or fob 102 may be personalized using RFID reader 104. Personalization system 116 and RFID reader 104 may engage in mutual authentication and RFID reader 104 may be configured to transmit the fob personalization file to fob 102 via RF. Once fob 102 is presented to RFID reader 104 (steps 608, 614) for personalization, fob 102 and RFID reader 104 may engage in mutual authentication (step 614). Where fob 102 is not presented to RFID reader 104 for personalization, the personalization process may be terminated (step 610).

If fob 102 is detected, personalization system 116 may create as a part of the personalization file, a unique identifier for providing to fob 102 (step 616). The identifier is unique in that one identifier may be given only to a single fob. That is, no other fob may have that same identifier. Fob 102 may then be configured and loaded with that identifier (step 618).

The encrypted fob 102 transponder account identifier may be populated into fob 102 in the same manner as is described with respect to the unique fob 102 identifier. That is, personalization system 116 may pre-encrypt the account data (step 620) and inject the encrypted account into fob database 214 (step 622). The encrypted account data may be loaded (e.g., injected) into fob 102 using RFID reader 104 as discussed above.

Once the personalization file is populated into fob 102, the populated information is irreversibly locked to prevent alteration, unauthorized reading and/or unauthorized access (step 624). Personalization system 116 may then create a log of the personalization file information for later access and analysis by the personalization system 116 resource (step 626).

It should be noted that in the event the personalization process is compromised or interrupted (step 628), personalization system 116 may send a security alert to the resource (step 630) and the personalization process may be aborted (step 612). On the other hand, where no such compromising or interruption exists, personalization system 116 may be prepared to begin initialization on a second device to be personalized (step 632).

Figure 7A:
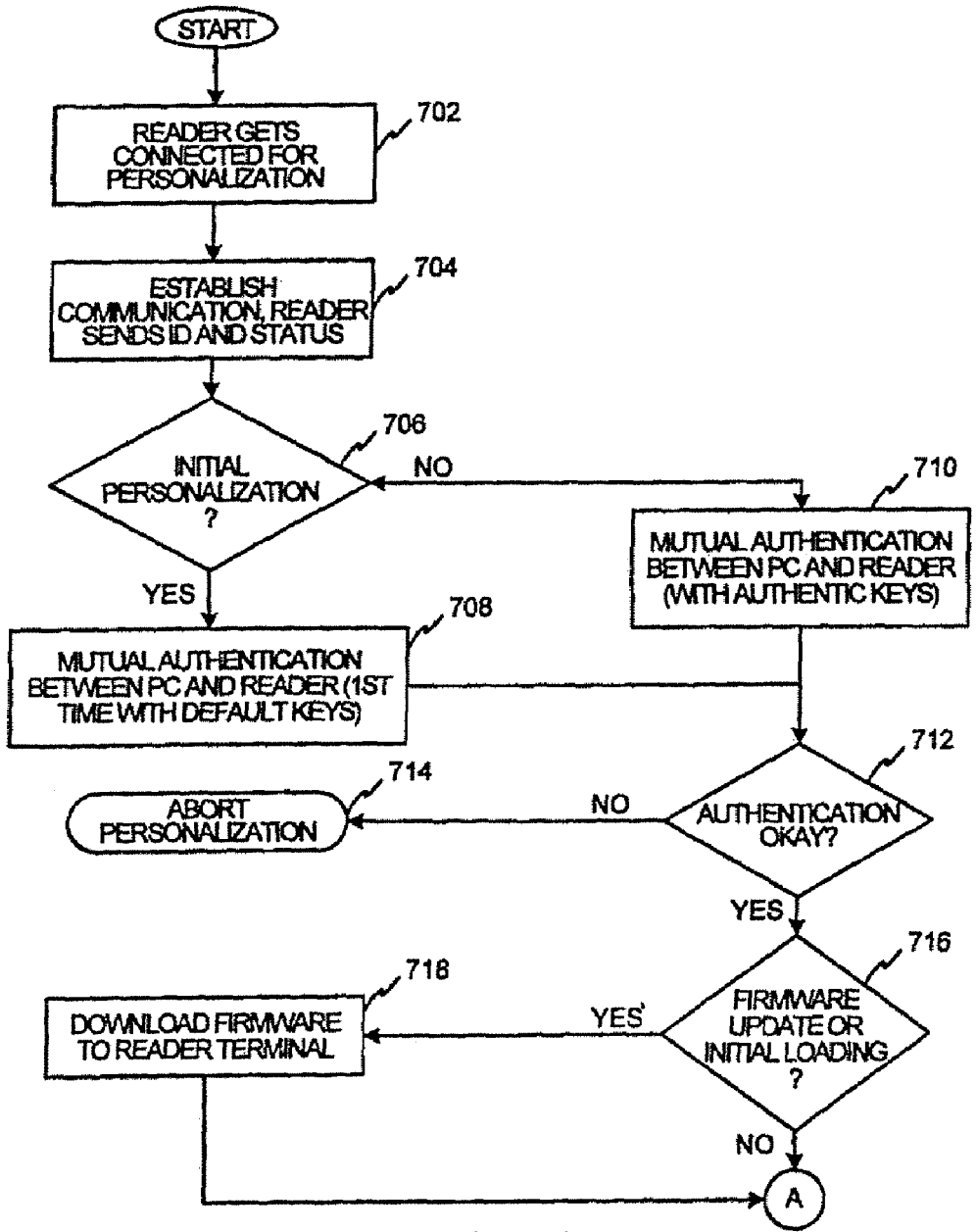
FIGS. 7A and 7B are an exemplary flow diagram of a RFID reader personalization process in accordance with the present invention.
Figure 7B:
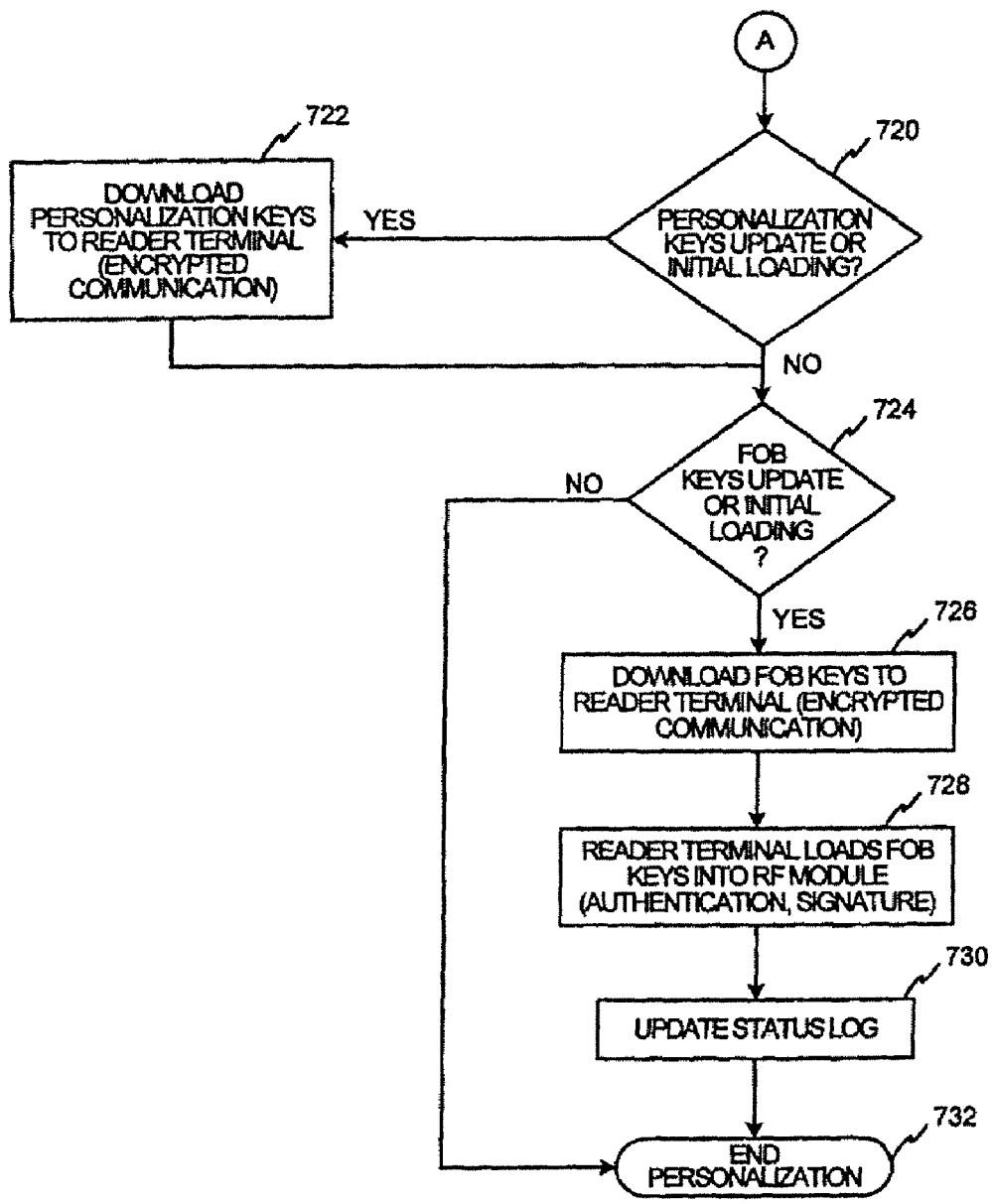

FIGS. 7A and 7B illustrate another exemplary embodiment of a personalization process which may be used to personalize RFID reader 104. RFID reader 104 may be in communication with personalization system 116 via RFID reader USB connection 316 (step 702). Once connected, personalization system 116 may establish communications with RFID reader 104 and RFID reader 104 may provide personalization system 116 any RFID reader 104 identification data presently stored on RFID reader 104 (step 704). In accordance with step 708, where RFID reader 104 is being personalized for the first time (step 706), RFID reader 104 and personalization system 116 may engage in mutual authentication as described above with respect to FIGS. 6A and 6B. After the mutual authentication is complete, personalization system 116 may verify that RFID reader 104 is properly manufactured or configured to operate within system 100. The verification may include evaluating the operation of RFID reader 104 by determining if the RFID reader will accept predetermined default settings. That is, personalization system 116 may then provide RFID reader 104 a set of default settings (step 708) and determine if RFID reader 104 accepts those settings (step 712). If RFID reader 104 does not accept the default settings, personalization system 116 may abort the personalization process (step 714).

If the personalization system 116 determines that the personalization process is not the first personalization process undertaken by RFID reader 104 (step 706), personalization system 116 and RFID reader 104 may engage in a mutual authentication process using the existing security keys already stored on RFID reader 104 (step 710). If authentication is unsuccessful (step 712), personalization system 116 may abort the personalization process (step 714).

Where personalization system 116 and RFID reader 104 successfully mutually authenticate, personalization system 116 may update RFID reader 104 security keys (step 716). Updating the security keys may take place at any time as determined by a system 100 manager. The updating may take place as part of a routine maintenance or merely to install current security key data. The updating may be performed by downloading firmware into RFID reader 104 (step 718). In the event that personalization system 116 determines in step 706 that RFID reader 104 is undergoing an initial personalization, the firmware may be loaded into RFID reader 104 for the first time. In this context, "firmware" may include any file which enables the RFID reader 102 to operate under system 100 guidelines. For example, such guidelines may be directed toward the operation of RFID reader protocol/sequence controller 314.

Personalization system 116 may then determine if the personalization keys (e.g., security keys, decryption keys, RFID identifier) need to be updated or if RFID reader 104 needs to have an initial installation of the personalization keys (step 720). If so, then personalization system 116 may download the personalization keys as appropriate (step 722).

Personalization system 116 may then check RFID reader 104 to determine if fob 102 identifiers and corresponding security keys should be updated or initially loaded (step 724).

If no updating is necessary personalization system 116 may end the personalization procedure (step 732). Contrarily, if personalization system 116 determines that fob 102 identifiers and corresponding keys need to be updated or installed, personalization system 116 may download the information onto RFID reader 104 (step 726). The information (e.g., fob security keys and identifiers) may be downloaded in an encrypted format and RFID reader 104 may store the information in RFID reader database 310 as appropriate (step 728). Personalization system 116 may then create or update a status log cataloging for later use and analysis by personalization system 116 resource (step 730). Upon updating the status log, the personalization process may be terminated (step 732).

It should be noted that, in some instances it may be necessary to repersonalize the RFID reader in similar manner as described above. In that instance, the personalization process described in FIGS. 7A and 7B may be repeated.

Figure 8:
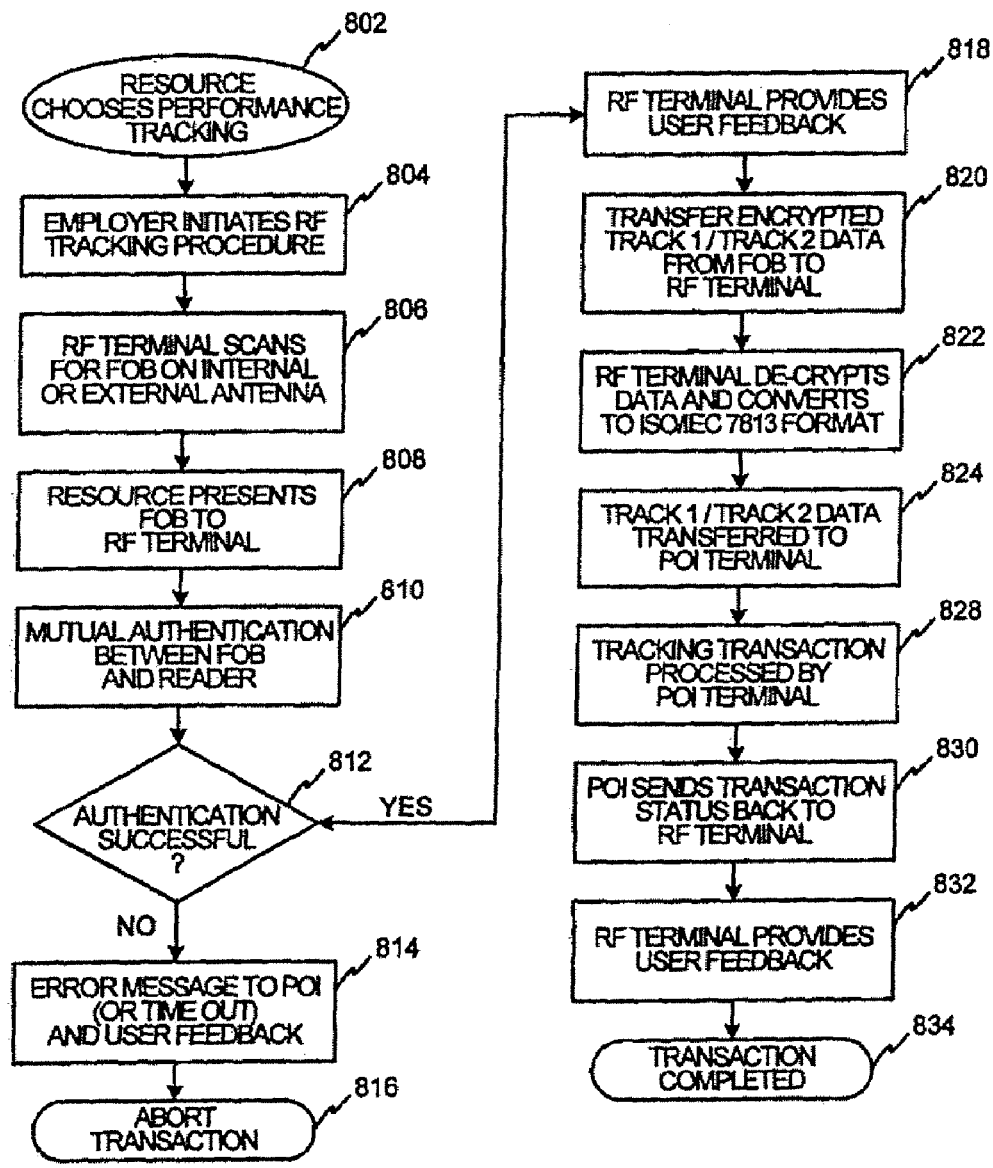
FIG. 8 is a flow diagram of an exemplary performance tracking process in accordance with the present invention.

FIG. 8 illustrates an exemplary flow diagram for the operation of system 100A. The operation may be understood with reference to FIG. 1A, which depicts the elements of system 100A which may be used in an exemplary transaction. The process is initiated when a resource desires to present fob 102 for performance tracking (step 802). Upon presentation of fob 102, the employer initiates the RF performance tracking transaction via RFID reader 104 (step 804). In particular, RFID reader 104 sends out an interrogation signal to scan for the presence of fob 102 (step 806). The RF signal may be provided via RFID reader antenna 106 or optionally via external antenna 108. The resource then may present fob 102 for performance tracking (step 808) and fob 102 is activated by the RF interrogation signal provided.

Fob 102 and RFID reader 104 may then engage in mutual authentication (step 810). Where the mutual authentication is unsuccessful, an error message may be provided to the resource via the RFID optical and/or audible indicator (step 814) and the performance tracking transaction may be aborted (step 816). Where the mutual authentication is successful (step 814), a performance tracking request will be initiated. That is, RFID reader 104 may provide the resource with an appropriate optical and/or audible message (e.g., "performance tracking processing" or "wait") (step 818). Fob protocol/sequence controller 208 may then retrieve from database 214 an encrypted fob account identifier and provide the encrypted account identifier to RFID reader 104 (step 820).

RFID reader 104 may then decrypt the account identifier and convert the account identifier into magnetic stripe (ISO/IEC 7813) format (step 822) and provide the unencrypted account identifier to resource engine 130 (step 824). In particular, the account identifier may be provided to POI terminal 110 for transmission to host network 112 for processing (step 828). Processing performance tracking will be discussed in greater detail herein. Upon processing, PO1 terminal 110 may then send an optical and/or audible performance tracking status message to RFID reader 104 (step 830) for communication to the resource (step 832). Once the resource receives the status message, the transaction is completed (step 834.)

Processing performance tracking may be achieved by several methods. For example, in accordance with another aspect of the present invention, and with reference to FIG. 10, a resource 1002 may access resource engine 130 through user interface 118 to facilitate performance tracking, such as management, assignment, grading and/or scoring of resources, tasks, and/or applications.

Figure 11:
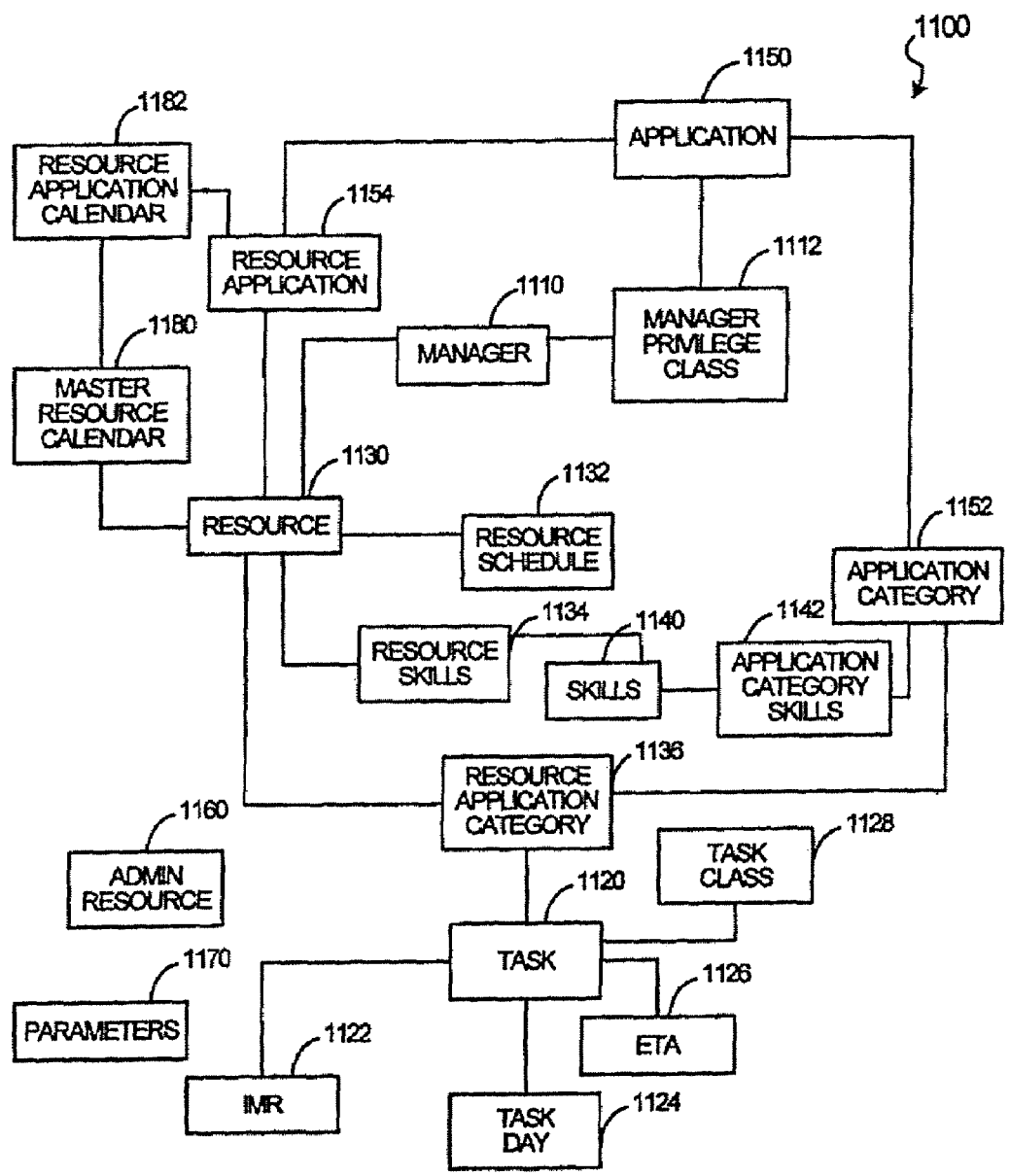
FIG. 11 includes an exemplary block diagram illustrating additional details of the resource engine component of the present invention.

More particularly, in one embodiment illustrated in FIG. 11, resource engine 130 may comprise a variety of subprograms and/or databases that facilitate managing, tracking, grading, and assigning resources, applications, skills, and tasks. Resource engine 130 may interface with various subprograms or databases, wherein the subprograms may be part of host network 112 and/or network 136. One skilled in the art will appreciate that resource engine 130 may additionally interface with components directly, through a LAN network or indirectly via any other system or network.

The databases comprising resource engine 130 may be managed by an administrative resource 1160. Administrative resource may be an individual, software, and/or hardware configured to facilitate management, control, organization and/or oversight of resource engine 130. Additionally, there may be one or more parameters 1170 governing resource engine 130. Parameters 1170 may include, for example, security features, software requirements, hardware requirements, coding protocols and/or other requirements or preferences.

The databases comprising resource engine 130 may be interconnected such that information from one database may be accessed by one, two, three or more other databases. By the term "access," the databases may transmit, receive, obtain, link, connect, associate, interface, share, route, acquire, ascertain, retrieve, and gain information from one database to another. Thus, any information updated, received and/or sent to one database such as, for example, resource database 1130, may be automatically updated throughout all or any portion of the other databases that are accessed by resource database 1130.

For example, a resource database 1130 may access a master resource calendar 1180 for scheduling all resources. Master resource calendar 1180 may additionally access resource application calendar 1182 to access calendar and schedule information relating to the applications to which resource 1130 may be assigned. Resource database 1130 may also access a resource schedule 1132 for scheduling that specific resource. Additionally, resource database 1130 may access a resource skills database 1134 comprising information relating to the various skills of resource 1130. Resource database 1130 may access a resource application database 1154 comprising information relating to the application that resource 1130 is assigned to support. Further, resource database 1130 may access a resource application category 1136 comprising information relating to specific category subset of an application that a resource is assigned to support. Finally, resource database 1130 may access a manager database 1110 comprising information on managers and the portfolios for which the managers are responsible.

With further reference to an exemplary embodiment depicted in FIG. 2, application 1150 may also interface with a plurality of databases. For example, a manager privilege class 1112 database may access application 1150 to obtain information regarding the queues of problem tickets assigned to various managers 1110. Resource applications 1154 may also access application 1150 in order to provide resource 1130 updates, changes and/or other information to application 1150. Application 1150 may further be accessed and divided into various sub-application categories 1152. Application categories 1152 may be further accessed by application category skills 1142 in order to determine what skills 1140 are needed to support application category 1152. Application categories 1152 may also be accessed by resource application categories 1136 in order to link resources 1130 to applications 1150.

With further reference to an exemplary embodiment illustrated in FIG. 11, task databases 1120 may also interface with a plurality of databases. For example, task 1120 may access resource application category 1136. Additionally, task 1120 may access an IMR database 1122, which may provide information on specific tasks associated with an IMR. Further, task 1120 may access databases such as a task class 1128, an estimated time of arrival (ETA) 1126, and a task day 1124 database. Task class 1128 may provide information on the classification of task 1120, for example, whether task 1120 is a build task. ETA 1126 may provide estimations on task 1120 completion times based on previous task completion times. Task day 1124 may provide scheduling information for task 1120 relating to when task 1124 was assigned and/or when it is scheduled to be completed.

While FIG. 11 illustrates a plurality of databases interfacing in a specific manner, any of the databases comprising resource engine 130 may interface to one another in any manner, and the interfaces or connections are not limited to those depicted. For example, task day 1124 may additionally access master resource calendar 1180 and/or any other database comprising resource engine 130.

In an exemplary embodiment, the databases within resource engine 130, as illustrated in FIG. 11, may operate in real-time. In this context, "real-time" includes information that may be immediately, or nearly immediately, accessed at the time an IMR and/or task is generated. For example, upon detection of an application problem, an IMR is generated. This IMR is then automatically broken down into applications and application tasks. The tasks are further automatically assigned to managers and/or resources based on skill and availability. As such, upon discovery of an IMR, resource 1102 may immediately view or manage resources, applications, skills, and/or tasks associated with the IMR on resource engine 130 via user interface 118. Resource engine 130 may also immediately facilitate updates to resources, applications, skills, and/or tasks to a network such that resource 1102 may view any manual assignment or management changes through user interface 118.

One skilled in the art will also appreciate that resource engine 130 may operate fully or partially in any less than real-time mode, such as, for example, batch processing. In an exemplary embodiment, the system may operate partially in real-time and partially in batch mode, wherein during batch mode, system information may be stored, and periodically updated to the network. Thus, in this embodiment, resource 1102 may access resource engine 130 at a later time through user interface 118 to manage, assign, track, score or grade resources, tasks, applications, and skills.

The present invention may use the foregoing system components to perform the following method, wherein the exemplary steps discussed may be performed in any order. With respect to FIG. 12, resource 1102 may access resource engine 130 through user interface 118 (step 1201) by any communication method discussed herein. In one embodiment, resource 1102 selects a web-based option for interfacing with resource engine 130 such that the system presents the resource 1102 with an input screen. Resource engine 130 may then conduct an authorization (step 1203) by any method discussed herein, such as, for example, by use of RFID reader 104 communicating with PO1 terminal 110.

Once authentication has occurred, resource engine 130 then may transmit a webpage and/or a resource screen for display on resource's 1102 computer (step 1205). The webpage and/or resource screen may facilitate access to resource engine 130 for performance tracking of resources (step 1207). With reference to an exemplary screen shot illustrated in FIG. 13, resource screen 1300 may be configured with one or more toolbars 1302 and/or task bars 1304 that facilitate navigation of engine 130. Toolbar 1302 may be configured to be visible to resource 1102 at all times when navigating engine 130 through user interface 118. Taskbar 1304 may be configured to facilitate performance tracking for the specific tool chosen through toolbar 1302.

Figure 13:
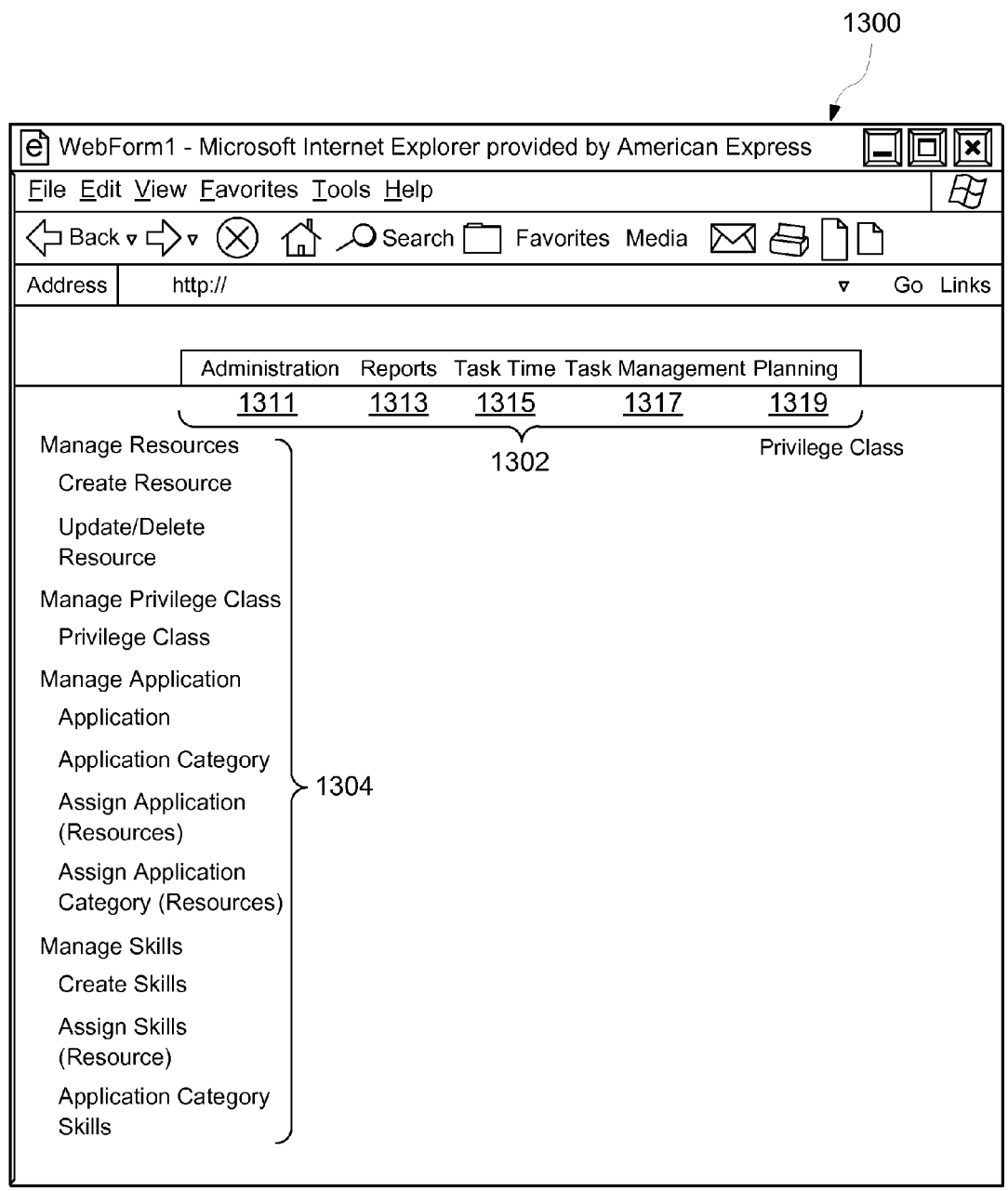
FIG. 13 includes an exemplary screen shot of a software program used to facilitate tracking of resource performance in accordance with the present invention.

With continued reference to FIG. 13, resource screen 1300 may also be configured to facilitate resource 1102 using toolbar 1302 in selecting a variety of tools to be used by the present invention. These tools may include, for example, managing resources, IMRs, tasks, applications and skills through, for example, "ADMINISTRATION" 1311; viewing reports on resource tasks and skills, "REPORTS" 1313, automating and viewing task time, "TASK TIME" 1315; creating, assigning and updating tasks, "TASK MANAGEMENT" 1317; and/or creating resource rosters, schedules, and training, "PLANNING" 1319. The details of these tools will be discussed below. In accordance with a further aspect of the present invention, one skilled in the art will appreciate that the web environment may be customizable and scalable, offering various other resource screen 1300 options depending upon the particular needs of resource 1102.

Figure 10:
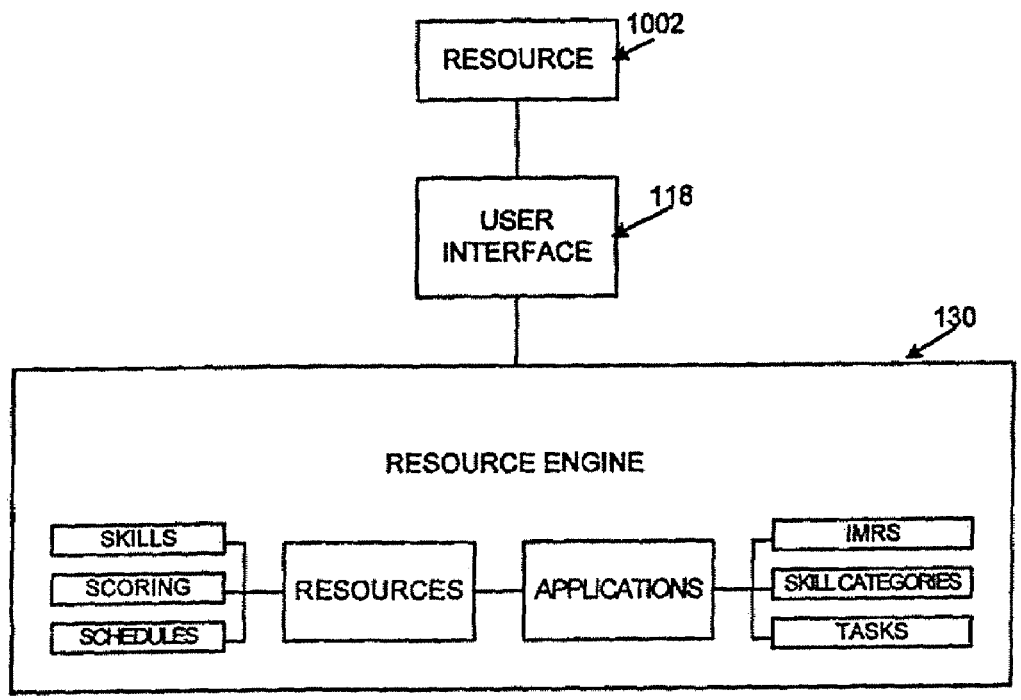
FIG. 10 includes a flowchart illustrating an exemplary resource engine system configured to facilitate tracking of resource performance.
Figure 12:
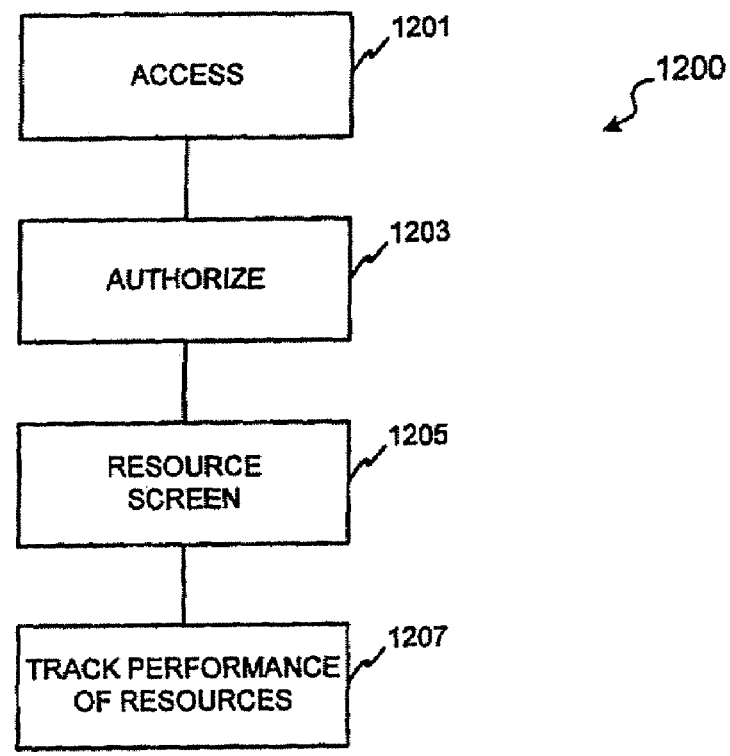
FIG. 12 includes a flowchart illustrating an exemplary method for assigning tasks in accordance with the present invention.

In accordance with the present invention, as illustrated in FIGS. 10, 12 and 13, resource 1102 may interact with resource engine 130 through user interface 118, using a device configured to facilitate interaction such as ADMINISTRATION 1311, available through resource screen 1300. When accessing administration information through ADMINISTRATION 1311, resource 1102 may be presented with a variety of options regarding the information accessible through taskbar 1304. These may include, for example, "Manage Resources," "Manage Privilege Class," "Manage Application," and "Manage Skills." Each of these various categories may contain one or more additional links to further performance tracking.

The various resource fields may include, for example: First Name, Middle Name, Last Name, Phone Number, E-mail Address, Employer, Role, Manager, Location, Portfolio Description, Skill, Skill Level, Application, Resource Percentage, Start Date, and Weekly End Date. By selecting "Manage Resources," resource/manager 1002 may manage resources within its group by selecting the link/button indicating that specific task. By the terms "manage" and "management," resource/manager 1002 may add, edit, delete, save, assign, reassign, search, define, determine, create, and/or cancel information relating to resources within its group. For example resource/manager 1002 selecting the Edit button may make changes to various fields associated with a resource.

"Manage Resources" may be configured such that the only time any of the Add, Edit, Delete, Save, or Cancel buttons will display is if the person trying to administer a resource has rights to do so. Thus, only an administrator, manager, manager/lead, and/or any other authorized person may update the Manage Resource screen. Resource engine 130 may be configured such that all buttons will be grayed out or unselectable to resources 1002 without access rights.

After an authorized resource/manager 1002 inputs changes, resource engine 130 may be configured to present an error message if all required fields are not completed. If all required fields are completed, information inputted into the fields may be automatically updated into resource engine 130.

In accordance with an exemplary embodiment of the invention, fob resource 1002 may be provided limited access to a fob resource data file maintained within the "Manage Resources" area of resource engine 130 for managing the fob usage and fob resource 1002 information. Resource 1002 may have access over the phone, online, or off line. Resource 1002 may access the fob resource data file to change, for example, demographic information ((e.g. fob resource address, phone number, email address, or the like).

ADMINISTRATION 1311 may additionally facilitate the management of privilege classes through the "Manage Privilege Class" option on task bar 1304. Privilege classes may include designations, such as queue names, relating to IMRs/application failures tracked through resource engine 130 and/or through a monitoring program, such as NetView working in conjunction with resource engine 130. For example, NetView may automatically identify and generate a problem ticket describing the root cause of a network failure. NetView may then transmit the problem ticket/IMR to a specific network failure privilege class within resource engine 130. Transmission of the IMR from NetView to resource engine 130 may be through any communications means described herein.

By selecting "Manage Applications," resource/manager 1002 may manage applications and application categories. Additionally, resource/manager 1002 may assign/add resources to applications and/or application categories. Applications may be any software applications, processes, procedures, scripts, programs, and/or protocols running on a system, for example, Microsoft Word, a Service Delivery Platform application, and a windows application. Application categories may be any subsets of Applications. For example, an Application may have a Distributive category and a Mainframe category. By "assign" and/or "assignment," resource/manager 1002 may determine the resources to be assigned to applications, determine the resources to be assigned to application categories, define how much time a resource is assigned to an application or application category, determine the starting and/or ending date for an assignment for planning purposes, and/or track a resource's time spent on specific tasks, applications and/or application categories.

Additionally, resource/manager 1002 may use "ADMINISTRATION" 1311 to facilitate the management of resource skills by selecting the "Manage Skills" task. "Manage Skills" may be used to facilitate managing skills and skill sets available and/or needed for applications and application categories, defining and scoring the skills and skill sets of resources, determining skill set levels needed for application categories, assigning resources to application categories based upon resource skills and/or skill set scores, determining skill set scores for resources assigned to those application categories, and redefining resource skills and/or skill set scores.

Resource engine 130 may employ one or more algorithms to facilitate the management of resource skills. That is, one or more algorithms may be used in defining, scoring, determining, and assigning resources, skills, skills sets, and skill set needs. These algorithms may be automated such that resource engine 130 automatically tracks resources and application categories to continuously rescore and grade resource skills, skill sets and application categories. Resource engine 130 may also be configured to allow for manual calculation, scoring, and grading of resource skills, skill sets and application categories for assignment and management purposes.

Resource/manager 1002 may assign one or more skills to a specific category, for example, one application category (e.g. Service Delivery Platform services) may include multiple skills (a "skill set") to support it such as: Visual Basic, Microsoft SQL, exchange management skills, phone payment skills, information management skills, and Cobol. Resource/manager 1002 may additionally define "skill set" scores. For example, high Visual Basic, Microsoft SQL, and Cobol skills may be needed, while medium exchange management, and information management skills may be required and low phone payment skills may suffice. The skill set scores for the specific application category may be as follows:

| Skills | Skill Level | Score |
|---|---|---|
| Visual Basic | H | 80 |
| Microsoft SQL | H | 80 |
| exchange management | M | 60 |
| phone payment | L | 30 |
| information management | M | 60 |
| Cobol | H | 80 |
| Total | | 390 |

The application categories skills may be further scored to determine the score parameters for the skill levels needed to support the category. For example, high skill levels would encompass scores that are 80% of 390 and above. An example of the parameters can be viewed in the following table:

| 80% | H | 312 |
|---|---|---|
| 60% | M | 234 |
| 30% | L | 117 |

Resource engine 130 may be used to facilitate scoring skills and/or skill sets of resources. By "scoring," resource/manager 1002 defines a resource's skills for a specific category. The score levels may be, for example, high, medium, or low, wherein a high score may be assigned, for example, 80 points, a medium score may be assigned 60 points and a low score may be assigned 30 points.

For example, a resource's skills may be defined as follows:

| Skills | Skill Level | Score |
|---|---|---|
| Visual Basic | M | 60 |
| Microsoft SQL | H | 80 |
| exchange management | L | 30 |
| phone payment | M | 60 |
| information management | L | 30 |
| Cobol | M | 60 |
| Total | | 320 |

The resource's skill set may be then compared to a category skill set to determine if the resource may be assigned to the category. This may be done by calculating a total resource category score based on the lower of the resource and task category scores. In the provided example, the resource's category skill score is 290. The resource therefore has medium-level category skills (where medium is any score from 234-311).

| Resource Skill Score | Category Skill Score | Resource Category Score |
|---|---|---|
| 60 | 80 | 60 |
| 80 | 80 | 80 |
| 30 | 60 | 30 |
| 60 | 30 | 30 |
| 30 | 60 | 30 |
| 60 | 80 | 60 |
| Total 320 Category Level | 390 | 290 |

Resource/manager 1002 may also use resource engine 130 to facilitate defining resource application portfolios. For example, resource engine 130 may be configured to gather all the application categories for a resource's portfolio of applications the resource is desired to support. Resource engine 130 may be configured to compute scores for the application categories in order to determine a rating for the resource, where the rating may range from a G1 (the lowest) to a G5 (the highest).

| G-Rating | |
|---|---|
| G1 | Greater than 0 but less than 75% |
| G2 | Greater than or equal to 75% but less than 90% |
| G3 | Greater than or equal to 90% but less than 110% |
| G4 | Greater than or equal to 110% but less than 125% |
| G5 | Greater than 125% |
| G-Rating | % of average standard hours |

For example, a resource's application portfolio may contain three application categories. The resource may have ten different skills, each skill may be scored as follows:

| Skills | Skill Level | - Score |
|---|---|---|
| Skill-1 | H | 80 |
| Skill-2 | M | 60 |
| Skill-3 | M | 60 |
| Skill-4 | L | 30 |
| Skill-5 | H | 80 |
| Skill-6 | H | 80 |
| Skill-7 | M | 60 |
| Skill-8 | M | 60 |
| Skill-9 | L | 30 |
| Skill-10 | M | 60 |

The three application categories in the resource's portfolio may have the following required skill sets:

| Skills | Skill Level | Score |
|---|---|---|
| Application Category 1 | | |
| Skill-1 | M | 60 |
| Skill-2 | L | 30 |
| Skill-3 | H | 80 |
| Skill-4 | M | 60 |
| Skill-5 | L | 30 |
| Total Score | | 260 |
| 80% | H | 208 |
| 60% | M | 156 |
| 30% | L | 78 |
| Application Category 2 | | |
| Skill-2 | M | 60 |
| Skill-6 | L | 30 |
| Skill-7 | H | 80 |
| Total Score | | 170 |
| 80% | H | 136 |
| 60% | M | 102 |
| 30% | L | 51 |
| Application Category 3 | | |
| Skill-3 | L | 30 |
| Skill-4 | H | 80 |
| Skill-7 | M | 60 |
| Skill-8 | L | 30 |
| Total Score | | 200 |
| 80% | H | 160 |
| 60% | M | 120 |
| 30% | L | 60 |

Thus, the resource will have a portfolio score as follows:

| Res. Skills | Cat. Skills | Score | Res. Skills | Cat. Skills | Score | Res. Skills | Cat. Skills | Score |
|---|---|---|---|---|---|---|---|---|
| 80 | 60 | 60 | 60 | 60 | 60 | 60 | 30 | 30 |
| 60 | 30 | 30 | 80 | 30 | 30 | 30 | 80 | 30 |
| 60 | 80 | 60 | 60 | 80 | 60 | 60 | 60 | 60 |
| 30 | 60 | 30 |   |   |   | 60 | 30 | 30 |
| 80 | 30 | 30 |   |   |   |   |   |   |
|   | Total | 210 |   | Total | 150 |   | Total | 150 |
|   | Level | H |   | Level | H |   | Level | M |
|   |   | Portfolio Total Score |   |   |   |   | 510 |   |

Resource engine 130 determines the rating of the resource based on the percentage of the total application category scores the resource scores in:

| Application X | |
|---|---|
| Task | Total Score |
| Task-1 | 260 |
| Task-2 | 170 |
| Task-3 | 200 |
| Total | 630 |
| 1 | <472.5 |
| 2 | <567 |
| 3 | <693 |
| 4 | <787.5 |
| 5 | >787.5 |

Thus, in order to achieve a G1 rating, the resource would need to score of less than 472.5. However, the resource in this example would rate as a G2 because the resource's total portfolio score is 510, which is greater than the 75% range of the total category score of 630, but less than the 90% range.

Each portfolio may have its own defined scoring based on application categories that make up the portfolio. The selection process may be chosen by a manager and/or resource engine 130 which selects specific application categories for all applications the manager and/or resource engine 130 supports or by gathering all application categories for a specific resource.

In accordance with another aspect of the present invention, when hiring new hires, resource engine 130 may be configured to facilitate the generation of a portfolio application required for the new hire and a generation of a listing of skills that comprise the portfolio. Resource engine 130 may further be configured to facilitate grading of each skill based on interview answers and generating a total score and G rating for the potential new hire.

Further, resource engine 130 may be used to determine current resource skill levels in order to determine hiring needs, training needs, equipment, software, and/or hardware upgrades, and/or other needed support. Resource engine 130 may employ one or more algorithms to facilitate a determination of current resource skill levels. That is, one or more algorithms may be used in generating a portfolio application for a potential new hire, generating a listing of skills within the portfolio, grading the skills based on potential new hire answers, and generating a total score for the potential hire. These algorithms may be automated such that resource engine 130 automatically generates and grades potential new hire portfolios and interviews. Resource engine 130 may also be configured to allow for manual generation of portfolios and portfolio skills and grading of potential hires.

With reference again to an exemplary embodiment depicted in FIG. 13, "TASK TIME" tool 1313 may be accessed by resource 1102 view automatically tracked time spent on different tasks. For example, resource 1102 may use fob 102 to communicate with RFID reader 104 when resource 1102 enters/leaves a work environment. Resource engine 130 may then calculate the total time resource 1102 was in the work environment by measuring the time between a first communication between fob 102 and RFID reader 104 and a second communication between fob 102 and RFID reader 104. For example, if a first communication occurs at 9:00 a.m. and a second communication occurs at 5:00 p.m., then the time resource 1102 was in the work environment is eight hours. If resource 1102 enters and leaves a work environment multiple times throughout a reporting period (e.g., a day), resource engine 130 may be configured to keep a running tally of times corresponding to each period between entering and leaving.

As used herein, the phrase work environment may include an office, a building, a shipping location, a computer environment, a computerized application, a computerized document, and/or any other work environment.

Resource engine 130 may be additionally configured to calculate the time between communications between fob 102 and interface 134 to determine the time spent by resource 1102 on specific tasks. For example, with reference to FIG. 1A, resource 1102 may use fob 102 to automatically communicate with computer 134 when resource 1102 initiates use of computer 134. Computer 134 may be configured to log the tasks resource 1102 performs via computer 134. Computer 134 may also be configured to communicate information to resource engine 130 relating to the tasks resource 1102 performs via computer 134. Resource engine 130 may use this information to facilitate tracking the performance of resource 1102.

Resource engine 130 may also be configured to provide for "TASK MANAGEMENT" 1315 available through resource screen 1300. This tool may be used to facilitate management of application tasks. Tasks may include any project defined herein. Each task may be assigned to an application category and an application. Additionally, each task may have one or more subtasks with each subtask having a resource assigned to it. One manager may be assigned to each task.

Tasks may be further categorized by class. For example, tasks generated from problem tickets may be classified as IMRs. Other classes may include, for example, tasks relating to assembly, meetings, training, bridge calls, projects, analysis, design, programming and build tasks.

Resource engine 130 may also be used to facilitate the creation of subtasks associated with each task. For example, once an IMR is generated, subtask X may be the first task generated. Subtask X may relate to re-installing problem software. Additionally, another subtask for analyzing the re-installed software may be generated, subtask Y. An analyst resource may then review the re-installation and determine that another analysis and/or installation task needs to be assigned. Resource engine 130 may be configured to automatically generate subtasks based on pre-programmed standards. For example, resource engine 130 may be pre-programmed to assign tasks relating to re-installation of software and analysis of a network whenever a network failure occurs. Resource engine 130 may also be configured for manual creation and/or reassignment of subtasks associated with each task.

Resource engine 130 may also be configured to automatically reassign a task and/or subtask to another resource if a resolution of the IMR has not been accomplished within a set task time period. For example, resource engine 130 may first assign IMR-related tasks of re-installation and analysis to be completed within 10 working hours. If the IMR has not been completed within a certain set time, such as, for example 15 hours, resource engine 130 may automatically reassign the re-installation and/or analysis tasks. Resource engine 130 may access time entries from "TASK TIME" to determine whether tasks have been completed within a predetermined time.

Resource engine 130 may also be configured to automatically generate a log of information relating to the resources and tasks already completed and/or worked on relating to the IMR. For example, if Word, Excel and PowerPoint have already been reinstalled successfully, resource engine 130 may be configured to create a log of this information before reassigning the task.

Resource engine 130 may be configured to facilitate the grading of tasks as well. Tasks may also receive the same G-1 through G-5 ratings as resources. The ratings may be based on the actual hours taken to complete a task compared to a standard. The standard hours for a task may be defined by a lead programmer, a manager, and/or resource engine 130 using a model based on subjective standards for task completion times. The standard hours to complete a task may be based on the skill level of an average resource supporting an application. For resources with high skills, the standard hours may be 90% of the average standard hours. Similarly, for low skill resources, the standard hours may be 110% of the average standard hours.

Ratings may be computed assuming the actual hours spent on a task. Errors may be created in labor tracking and often measuring a specific task may be inaccurate. However, resource engine 130 may increase accuracy by combining the total effort for all tasks in a specified window of time. The bigger the window of time and/or the more tasks that are being graded, the more accurate the grading score.

For any chosen window, there may be the possibility of having open tasks and closed tasks. Resource engine 130 may be configured to grade only closed tasks. If a closed task falls partly within a window, it may be graded based on the percentage of the task within the window being graded. In order to determine this percentage, resource engine 130 may be configured to define a Factor to adjust the standard hours in the window. The Factor may be created as follows:

$$Factor = \frac{\text{Task Actual hours defined within window interval}}{\text{Total task Actual}}$$

Resource engine 130 may be configured to multiply the Factor and the standard hours to determine the adjusted standard hours for a task. For example:

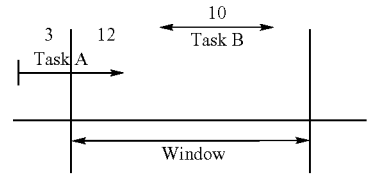

Task B has 10 actual task hours and the hours are defined within the window. Task B has a factor of 1 (10/10=1).

Task A has 15 actual task hours, 12 hours are defined within the window, and 3 hours are outside of the window. Task A has a factor of 0.8 (12/15=0.8)

Resource engine 130 may also be configured to grade the efficiency of tasks. In order to obtain a Grading efficiency for closed tasks, resource engine 130 may total all the closed task hours within a window and then divide that number by the sum of all task hours within the same window. The following example shows a window of 100 hours with 90 closed hours within the window.

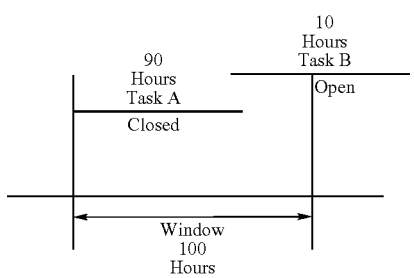

The result is a grading efficiency of 90%. Based on a grading efficiency of 90, the G-rating would be G3.

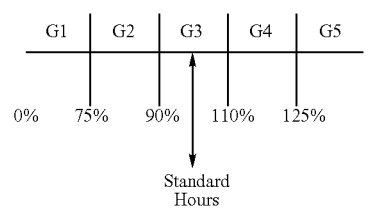

The following is an example of how a resource task may be graded by resource engine 130. The diagram below illustrates 10 tasks assigned to a resource. It shows how the tasks relate to a window defined by the resource start and end dates.

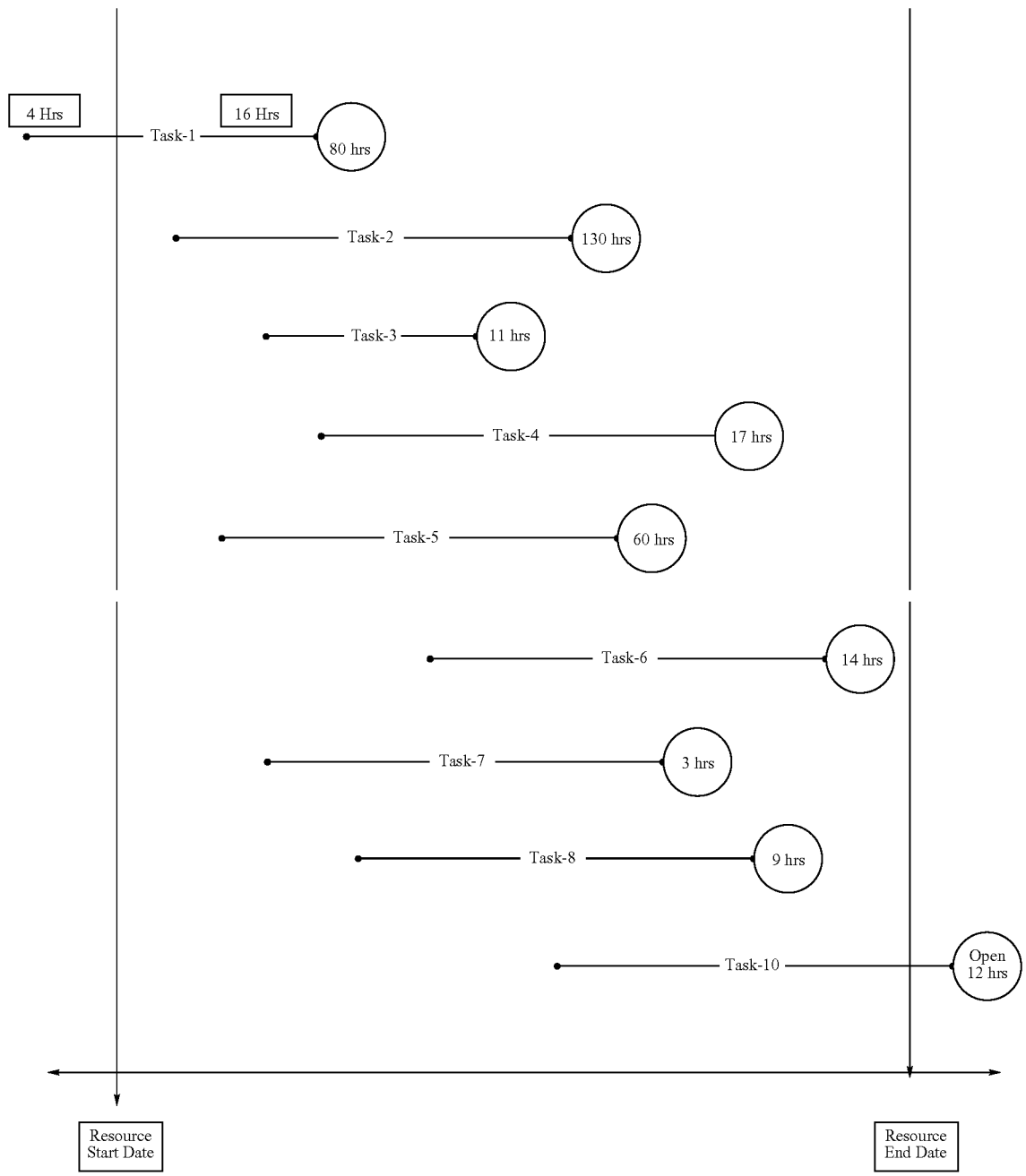

The following chart shows that tasks 1 through 9 are closed and task 10 is still open. Resource engine 130 may use only the closed tasks for the grading. The total task hours equals 174 but only the closed task hours, equaling 166, may be used in the grading.

The chart also shows that task 1 has 20 actual hours but only 16 actual hours are inside of the window selected to grade. Resource Engine 130 may use a factor of 0.80 (16/20) to obtain the adjusted standard hours needed to do grading. Tasks 2 through 9 are all within the window so their factor is equal to 1.00.

| | Actual Task Hours | | | |
|---|---|---|---|---|
| Task | Status | Task | Window | Factor |
| Task - 1 | Closed | 20 | 16 | 0.80 |
| Task - 2 | Closed | 30 | 30 | 1.00 |
| Task - 3 | Closed | 11 | 11 | 1.00 |
| Task - 4 | Closed | 17 | 17 | 1.00 |
| Task - 5 | Closed | 60 | 60 | 1.00 |
| Task - 6 | Closed | 14 | 14 | 1.00 |

-continued

Actual Task Hours

| Task | Status | Task | Window | Factor |
|---|---|---|---|---|
| Task - 7 | Closed | 3 | 3 | 1.00 |
| Task - 8 | Closed | 9 | 9 | 1.00 |
| Task - 9 | Closed | 6 | 6 | 1.00 |
| Task - 10 | Open | 12 | 8 | |
| Total closed | task hours | | 166 | |
| Total | task hours | | 174 | |

The next chart shows the application category assigned to the closed tasks and the standard hours associated with each application category. Resource engine 130 may be configured to multiply the standard hours against the factor to arrive at the adjusted standard hours. Resource engine 130 may additionally be configured to add the adjusted standard hours for all the closed tasks in order to obtain the total standard hours.

| Application | Task | Standard Hours | Factor | Adjusted Standard Hour |
|---|---|---|---|---|
| Application Category 1 | Task - 1 | 16 | 0.80 | 12.8 |
| Application Category 1 | Task - 2 | 32 | 1.00 | 32.0 |
| Application Category 1 | Task - 3 | 8 | 1.00 | 8.0 |
| Application Category 1 | Task - 4 | 16 | 1.00 | 16.0 |
| Application Category 2 | Task - 5 | 64 | 1.00 | 64.0 |
| Application Category 2 | Task - 6 | 16 | 1.00 | 16.0 |
| Application Category 1 | Task 7 | 4 | 1.00 | 4.0 |
| Application Category 1 | Task - 8 | 8 | 1.00 | 8.0 |
| Application Category 3 | Task - 9 | 4 | 0.80 | 4.0 |
| | | | | Total Standard Hours |

After resource engine 130 has determined the total standard hours, resource engine 130 can assign a grade and grade efficiency to the application category tasks. In the example herein, the resource task grade would be G3 since 166 is under 181 and the Grade efficiency equals 95.4%.

| Rating | Standard Hours = Weight | 164.8 Score |
|---|---|---|
| G1 | 75% | 124 |
| G2 | 90% | 148 |
| G3 | 110% | 181 |
| G4 | 125% | 206 |
| G5 | | Anything higher |

Figure 14:
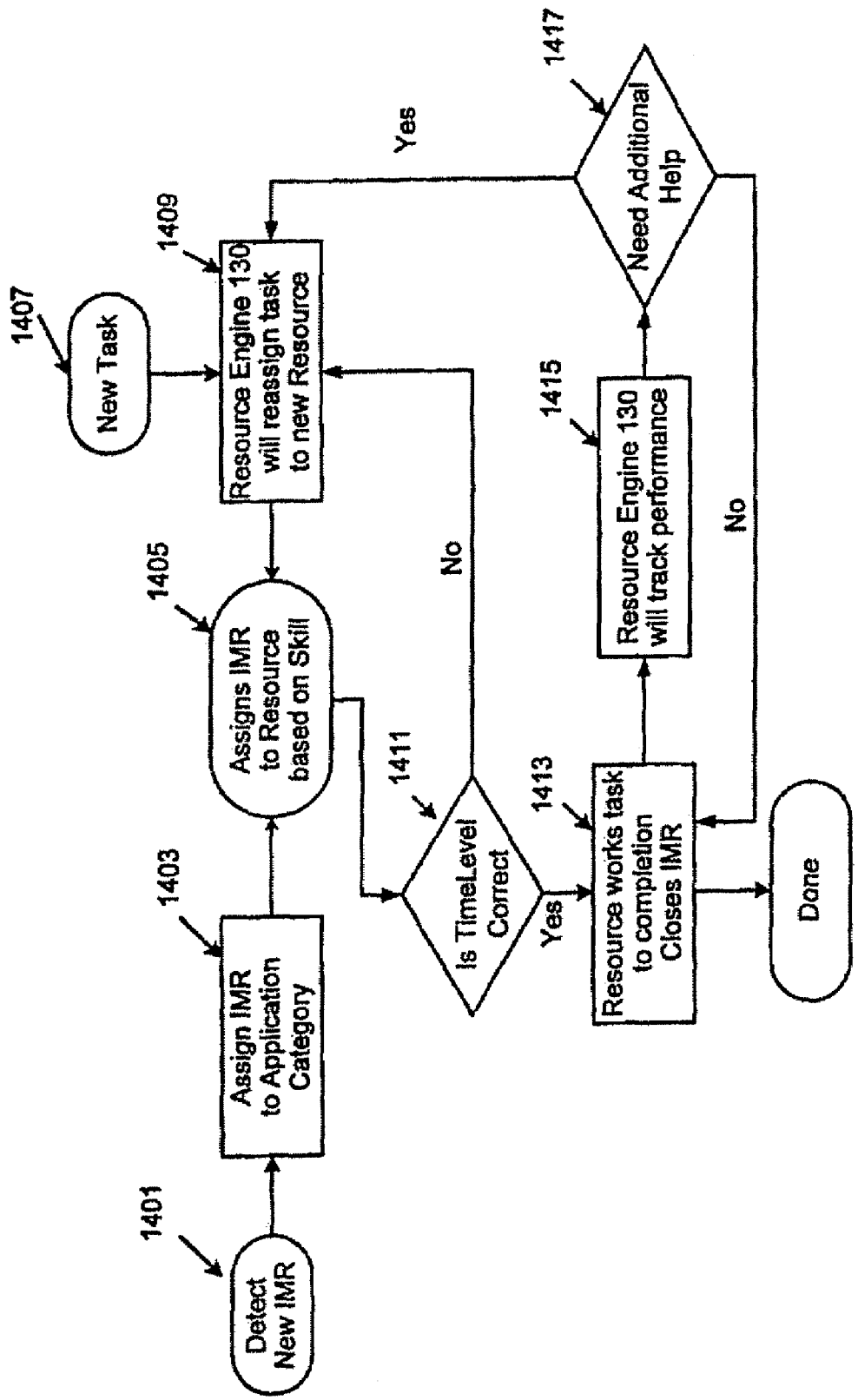
FIG. 14 includes a flowchart illustrating an exemplary method for facilitating the assignment of tasks to resources by assigning an information management record (IMR) to an application category, assigning IMR to a resource and working the task to completion, in accordance with the present invention.

In accordance with an exemplary aspect of the present invention, resource engine 130 may be configured to facilitate assignment of tasks to resources. With reference to an exemplary flowchart illustrated in FIG. 14, a new IMR may be detected (step 1401) by resource engine 130 or by a software program such as NetView connected to resource engine 130. Resource engine 130 may then assign the IMR to an application category (step 1403). Resource engine 130 may use any method discussed herein for assigning to an application category. Resource engine 130 may then assign the IMR to a resource (step 1405) based upon the resource's skill. If the resource cannot do a task, resource engine 130 may reassign the task to a new resource.

Resource engine 130 may also generate a new task (step 1407) at the same time the new IMR is detected. Resource engine 130 may then assign/reassign the new task (step 1409) to a resource by any method discussed herein for assigning tasks. If the resource cannot do a task, resource engine 130 may reassign the task to a new resource.

Resource engine 130 may also be configured to determine whether scheduling allows for a resource to complete a task in a specific time level (step 1411). Resource engine 130 may access master calendars, master schedules, resource calendars, and/or resource schedules in order to determine optimum scheduling. If scheduling does not permit a resource to do a task within a time level, resource engine 130 may reassign the task to a new resource.

Once resource engine 130 has assigned a task to a resource whose schedule fits the correct time period, the resource may begin working the task to completion (step 1413). Resource engine 130 may also track (step 1415) the resource's work on the task to determine whether the resource has encountered problems with the task and needs additional help (step 1417). If resource engine 130 determines that the resource needs additional help, it may reassign the task to another resource (step 1409). If resource engine 130 determines that the resource does not need additional help, the resource will continue working the task to completion (step 1415).

With reference again to FIG. 13, "PLANNING" 1317 may be accessed within resource engine 130 to facilitate the creation of employee rosters, the scheduling of meetings, training, tasks, personal time and projects, and the calendaring of resources, tasks and projects. Resource/manager 1002 may select, create, manage, add, delete, update and/or define resource schedule hours per work week. Additionally, resource engine 130 may be used to facilitate the creation of a resource calendar of the schedules of all resource/manager's 1002 resources.

Resource/manager 1002 may also access resource engine 130 to facilitate the creation of a master resource calendar. A master resource calendar may include capacity hours, personal hours, and compensation hours. Capacity hours are the number of hours of planned capacity for a resource. For example, if a resource is scheduled to work eight hours per day each five-day work week, the capacity for the resource would be 40 hours. The Capacity hours may be recomputed monthly, weekly, daily and/or annually. Personal hours may be vacation time, sick time, visa constraint time, jury duty time, and/or any other type of time off of work. Personal hours may vary from one resource to another. Compensation hours may include time a resource is allowed to take off for overtime hours previously worked. Resource engine 130 may be configured to compute available hours based upon the Capacity hours minus Personal hours and Compensation hours.

Resource/manager 1002 may also access resource engine 130 to facilitate the management of a resource application calendar. A resource application calendar may store resource-specific information regarding the actual hours spent by a resource on an application, the number of hours planned for meetings and training, and whether a resource is working within its capacity. Resource engine 130 may connect the master resource calendar with a resource application calendar to best schedule resources and determine resource actualized hours.

Resource engine 130 may also be configured to provide for "REPORTS" 1319 available through resource screen 1300. This tool may be used to facilitate the generation of resource task and skill reports. The reports may be used by resource/manager 1002 to manage local and remote resources. For example, resource engine 130 may be used to generate reports on resource performance, resource capacities, resource training needs, resource skill sets, resource deficiencies, task performance, task resource needs, task skill set needs, and application performance. Additionally, resource/manager 1002 may use REPORTS 1319 to determine trends, problem areas, and efficiencies amongst resources, tasks, and applications. For example, resource/manager 1002 may access resource engine 130 to generate a report on various teams of resources to determine which teams work more effectively together and which teams under perform. Additionally, resource engine 130 may be used to facilitate a determination of hiring, training, and staffing needs.

Figure 9:
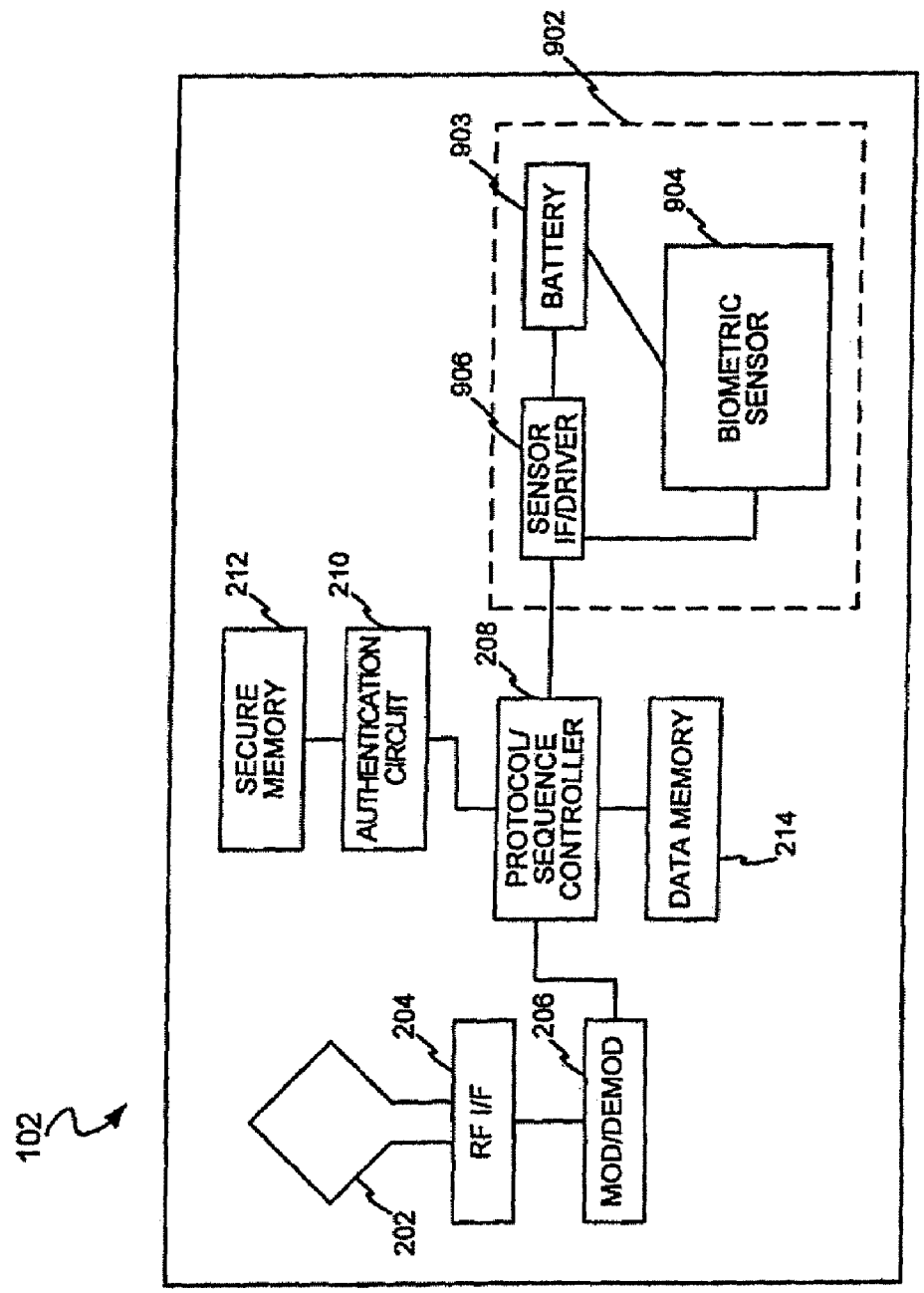
FIG. 9 is another schematic illustration of an exemplary fob configured to facilitate biometric security devices in accordance with the present invention.

In another exemplary application, illustrated in an exemplary embodiment depicted in FIG. 9, fob 102 may be configured to include a biometric security system 902, security system 902 may be used to facilitate performance tracking. In this case, a resource operating a fob may be asked to provide assurance that the resource is in fact the same resource whose details are stored on the fob. Accordingly, the resource may provide such verification by placing his finger over the biometric sensor 904. Biometric sensor 904 may then digitize the fingerprint and provide the digitized fingerprint for verification as described above. Once verified, fob 102 may provide a tracking transaction authorized signal to RF transponder 202 (or alternatively to transponder 220) for forwarding to RFID reader 104. RFID reader 104 may then provide the authorized signal to POI terminal 110 in a similar manner as is done with conventional PIN driven systems and POI terminal 110 may process the transaction under the employer's business as usual standard.

In another exemplary application, fob 102 and/or RFID reader 104 may be configured to facilitate biometric authentication of performance tracking. For example, a human resource using fob 102 and/or RFID reader 104 may pre-register biometric information that is unique to that human resource. For example, this biometric information may include one or more fingerprints, facial scans, retinal images, voice print, iris scans, and/or vascular patterns. By pre-registering, a user may set up one or more performance tracking accounts/tasks (e.g., programming tasks, build tasks, etc.) associated with his biometric information. When a human resource desires to use fob 102 and/or RFID reader 104 to track his performance on a task, he may use a biometric security device, similar to that described herein, in association with fob 102 and/or RFID reader 104 for authentication purposes. By authentication, the human resource's present biometric information may be compared to the pre-registered biometric information to find a match. Once a match is made, the human resource may be authorized to choose one or more tasks associated with his biometric information in order to begin performance tracking.

In yet another exemplary application of the present invention, fob 102 may be configured for use with global positioning technologies. For example, fob 102 may include any combination of positioning technology such as global position system (GPS), wireless assisted GPS, wireless assisted protocol (WAP) based location, geography markoff language (GML) based location, differential GPS, enhanced observed time difference (E-OTD), enhanced cell identification, and uplink time difference of arrival (U-TDOA) technologies. Fob 102 may be configured to communicate its positional information to one or more servers on network 136 and/or resource engine 130 to provide information based on the location of fob 102. For example, a resource, such as a package, may be configured with a GPS-enabled fob 102 such that the package may be constantly tracked in order to monitor its delivery performance.

In accordance with another exemplary application of the present invention, fob 102 may be used for travel, shopping and/or other businesses to facilitate the tracking of travel, shopping and/or other activities. For example, a shopper resource carrying fob 102, may enter a store and use fob 102 to track his progress through the store. Further, different aisles and/or checkpoints throughout the stores may be equipped with RFID readers 104 to facilitate tracking the shopper's performance. In a hardware store, as a further example, fob 102 may be used in conjunction with RFID readers 104 at the beginning and end of each aisle. Thus, when a shopper passes RFID reader 104, a performance tracking request may be initiated and recorded within resource engine 130. A manager and/or other user of resource engine 130 may then use this performance tracking data to determine which aisles the shoppers (and other shoppers) spend the most time in. The manager may then use this information to plan for scheduling employees, stocking supplies, ordering products, and/or any other related tasks. As yet another example, museums may use fobs 102 and RFID readers 104 to track wait times, viewing times, heavily trafficked areas and other related matters.

In another embodiment of the present invention, fob 102 may be used on all products in a business, such as, for example, a grocery store. The store may have various RFID readers 104 equipped throughout, such that managers and/or other users may track the different products throughout the store for security, stocking and/or other purposes. For example, RFID reader 104 may be used in conjunction with one or more third-party merchant systems, as described more fully in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS." Third-party merchant systems may include any issuer system and/or merchant system maintained by an entity, such as, for example, a non-financial or financial institution, American Express®, Visa® and/or MasterCard®, etc.

As an example of an exemplary aspect of the present invention in conjunction with the merchant system, fobs 102 and RFID reader 104 may be configured to eliminate the need for a clerk during checkout. Fobs 102 and RFID reader 104 may also facilitate transaction time for shoppers. For example, a shopper may push his cart past RFID reader 104 and all the products in the cart may communicate purchasing information to RFID reader 104 and one or more third-party merchant system via fobs 102 affixed to the products. A third-party merchant system may then be used to execute a payment transaction for the products. The shopper may then perform the transaction in an expedited way, as neither the ringing up of the products nor payment for the products may require a clerk's assistance. Additionally, RFID reader 104 may be configured to communicate product and purchasing information relating to the transaction to resource engine 130 for tracking purposes.

While security measures exist that allow stores to monitor whether products have been shoplifted, these security measures must be removed and/or deactivated at check-out. As a further example of an exemplary aspect of the present invention, fobs 102 may be configured such that they do not require deactivation and/or removal. Instead, fobs 102 and RFID reader 104, used in conjunction with products, may be configured to communicate with one or more third-party merchants and resource engine 130 to track the purchasing status of the products. For example, resource engine 130 may be configured to track whether fob 102 and RFID reader 104 have been used to engage in a merchant transaction. Thus, if a shoplifter tries to leave a store without paying for a product, RFID reader 104, located at the exit of the store, may be configured to communicate with resource engine 130 in order to determine whether the product was the subject of a merchant transaction. If resource engine 130 indicates that the product was not the subject of a merchant transaction, RFID reader may be configured to sound an audible and/or silent alarm and/or communicate with an alarm system to alert the store's security personnel.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A method for tracking performance by a shopper of a shopping activity comprising a plurality of shopping tasks, the method comprising:
    initiating the tracking of the shopping activity, the initiation requiring an active initiation action by the shopper;
    communicating a transponder identifier, from a transponder carried by the shopper, to a first reader in a first location via a radio frequency signal;
    communicating the transponder identifier from the first reader to a resource engine;
    associating the transponder identifier with a first time value and a shopper identifier corresponding to the shopper;
    communicating the transponder identifier, from the transponder, to a second reader in a second location via an radio frequency signal;
    communicating the transponder identifier from the second reader to the resource engine;
    associating the transponder identifier with a second time value and the shopper identifier corresponding to the shopper;
    computing a shopping task time representing a time period that the shopper was in a predefined shopping area, based at least on the first time value and the second time value;
    associating, in the resource engine, the shopper identifier and the shopping task time with a corresponding shopping task of the shopping activity; and
    determining, based on the shopping task time, a project task requiring performance by a resource associated with a specific level of skill, wherein both the project task and the level of skill vary based on at least one time threshold associated with the shopping task time.

2. The method of claim 1, wherein the tracing of the shopping activity is initiated by an interaction of the shopper with a user interface.

3. The method of claim 1, wherein the tracking of the shopping activity is initiated by receiving an opt-in request from the shopper.

4. A computer readable medium storing one or more sequences of instructions which, when executed by one or more processors, causes the one or more processors to perform the following steps:
    initiating the tracking of a shopping activity, the shopping activity comprising a plurality of shopping tasks and the initiation requiring an active initiation action by a shopper;
    communicating a transponder identifier, from a transponder carried by the shopper, to a first reader in a first location via a radio frequency signal;
    communicating the transponder identifier from the first reader to a resource engine;
    associating the transponder identifier with a first time value and a shopper identifier corresponding to the shopper;
    communicating the transponder identifier, from the transponder, to a second reader in a second location via an radio frequency signal;
    communicating the transponder identifier from the second reader to the resource engine;
    associating the transponder identifier with a second time value and the shopper identifier corresponding to the shopper;
    computing a shopping task time representing a time period that the shopper was in a predefined shopping area, based at least on the first time value and the second time value;
    associating, in the resource engine, the shopper identifier and the shopping task time with a corresponding shopping task of the shopping activity; and
    determining, based on the shopping task time, a project task requiring performance by a resource associated with a specific level of skill, wherein both the project task and the level of skill vary based on at least one time threshold associated with the shopping task time.

5. The computer readable medium of claim 4, wherein the tracing of the shopping activity is initiated by an interaction of the shopper with a user interface.

6. The computer readable medium of claim 4, wherein the tracking of the shopping activity is initiated by receiving an opt-in request from the shopper.

* * * * *